US009355501B2

(12) United States Patent
Taguchi et al.

(10) Patent No.: US 9,355,501 B2
(45) Date of Patent: May 31, 2016

(54) INFORMATION GENERATING PROGRAM, INFORMATION GENERATING METHOD, AND INFORMATION GENERATING APPARATUS

(75) Inventors: Terutoshi Taguchi, Ichikawa (JP); Masahiko Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 13/599,350

(22) Filed: Aug. 30, 2012

(65) Prior Publication Data

US 2013/0100153 A1 Apr. 25, 2013

(30) Foreign Application Priority Data

Oct. 20, 2011 (JP) .................................. 2011-230424

(51) Int. Cl.
*G06T 19/20* (2011.01)

(52) U.S. Cl.
CPC ......... *G06T 19/20* (2013.01); *G06T 2219/2008* (2013.01)

(58) Field of Classification Search
None
See application file for complete search history.

(56) References Cited

U.S. PATENT DOCUMENTS

| | | | | |
|---|---|---|---|---|
| 5,371,690 A | * | 12/1994 | Engel et al. | .................... 382/151 |
| 5,619,630 A | | 4/1997 | Minami et al. | |
| 5,717,598 A | * | 2/1998 | Miyakawa et al. | ........... 700/103 |
| 5,980,084 A | * | 11/1999 | Jones | ............... G05B 19/41805 |
| | | | | 700/103 |
| 6,157,902 A | | 12/2000 | Hirata et al. | |
| 2006/0085088 A1 | | 4/2006 | Nakayama et al. | |

FOREIGN PATENT DOCUMENTS

| | | | | |
|---|---|---|---|---|
| JP | 07-311792 | | 11/1995 | |
| JP | 08-106486 | | 4/1996 | |
| JP | 09-311883 | | 12/1997 | |
| JP | 10-312208 | | 11/1998 | |
| JP | 11296571 A | * | 10/1999 | .............. G06F 17/50 |
| JP | 2001-353631 | | 12/2001 | |
| JP | 2003-208452 | | 7/2003 | |
| JP | 4291321 | | 7/2009 | |
| JP | 2011-197921 | | 10/2011 | |
| WO | WO 2011047960 A1 | * | 4/2011 | |

OTHER PUBLICATIONS

Büker et al, Vision-based control of an autonomous disassembly station, 2001, Robotics and Autonomous systems.*

(Continued)

*Primary Examiner* — Kee M Tung
*Assistant Examiner* — Xin Sheng
(74) *Attorney, Agent, or Firm* — Staas & Halsey LLP

(57) ABSTRACT

A computer-readable medium stores a program causing a computer to execute a process including selecting a model from a storage device storing assembly data of an assembly; projecting in multiple directions, the selected model to a first area in a color different from a background color of the first area to generate first projection images, and to a second area equivalent in size to the first area, the model in a different color and another model in the same color as the background color, to generate second projection images; comparing the first and second projection images, according to verification direction to calculate scores indicating matching degree between the projection images; and determining as a disassembly direction for the model, a direction opposite to the verification direction of the projection image having the highest calculated score, to associate and store the disassembly direction and the model to the storage device.

16 Claims, 29 Drawing Sheets

(56) References Cited

OTHER PUBLICATIONS

Pomares et al, Virtual disassembly of products based on geometric models, 2004 Elsevier B.V.*

Miller et al, Automatic Assembly Planning with Fasteners, 1989, IEEE.*

Marco et al, Computer Animation and Visualization Techniques of Mechanical Products for Assembly Analysis, 2003, IEEE.*

Korean Office Action mailed Aug. 26, 2013 in corresponding Korean Application No. 10-2012-0099359.

* cited by examiner

FIG.5

| COMPONENT INFORMATION |||||||||||||
|---|---|---|---|---|---|---|---|---|---|---|---|---|
| IDENTIFICATION INFORMATION | pi |||||||||||
| SHAPE INFORMATION | FACET |||||| FACET NORMAL VECTOR ||||||
| | fi-1 to fi-ni |||||| vi-1 to vi-ni ||||||
| RELATIVE CO-ORDINATE VALUE | Ci |||||||||||
| RELATIVE ORIENTATION | Ri |||||||||||
| TOP-PRIORITY DIRECTION | ASSEMBLY DIRECTION |||||| DISASSEMBLY DIRECTION ||||||
| | |||||| ||||||
| 6-AXIS SCORE | LOCAL |||||| GLOBAL ||||||
| | +Xl | -Xl | +Yl | -Yl | +Zl | -Zl | +Xg | -Xg | +Yg | -Yg | +Zg | -Zg |
| | |||||| ||||||
| VIEWPOINT | |||||||||||
| MOVEMENT AMOUNT | |||||||||||

| ASSEMBLY INFORMATION | | | | | | | | | | | | |
|---|---|---|---|---|---|---|---|---|---|---|---|---|
| IDENTIFICATION INFORMATION | Ai | | | | | | | | | | | |
| IMMEDIATELY LOWER CONSTITUENT MODEL COUNT | mi | | | | | | | | | | | |
| PARENT ASSEMBLY IDENTIFICATION INFORMATION | Aj | | | | | | | | | | | |
| RELATIVE CO-ORDINATE VALUE | Ci | | | | | | | | | | | |
| RELATIVE ORIENTATION | Ri | | | | | | | | | | | |
| TOP-PRIORITY DIRECTION | ASSEMBLY DIRECTION | | | | | | DISASSEMBLY DIRECTION | | | | | |
| | | | | | | | | | | | | |
| 6-AXIS SCORE | LOCAL | | | | | | GLOBAL | | | | | |
| | +Xl | -Xl | +Yl | -Yl | +Zl | -Zl | +Xg | -Xg | +Yg | -Yg | +Zg | -Zg |
| | | | | | | | | | | | | |
| VIEWPOINT | | | | | | | | | | | | |
| MOVEMENT AMOUNT | | | | | | | | | | | | |

600

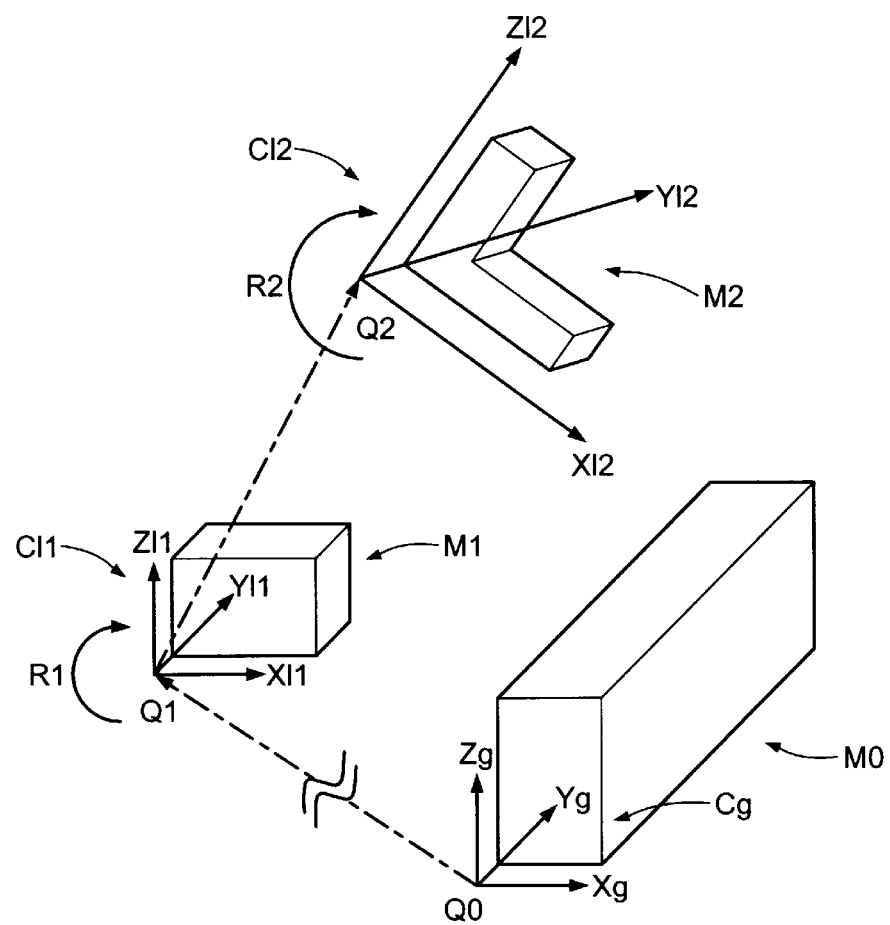

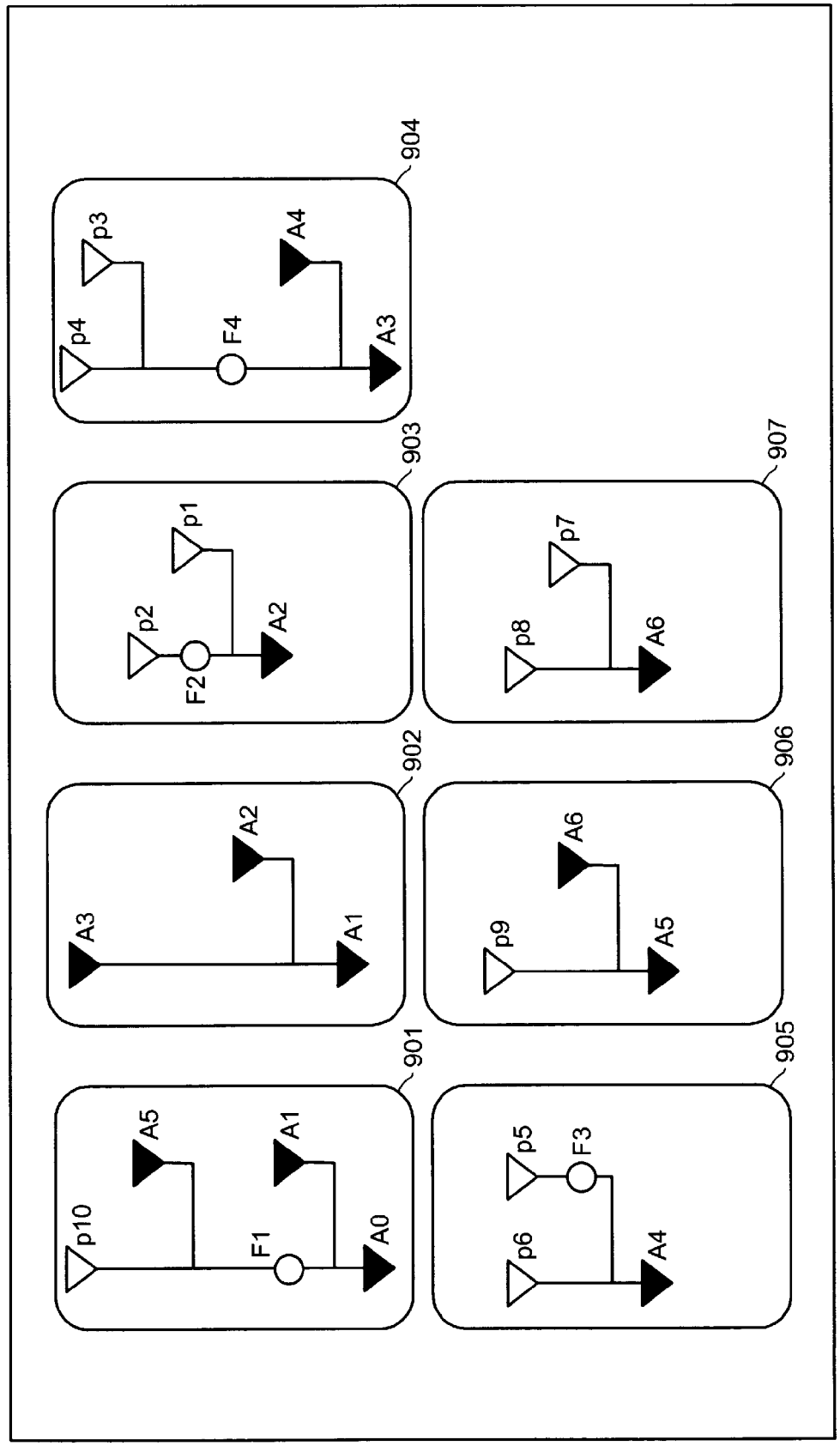

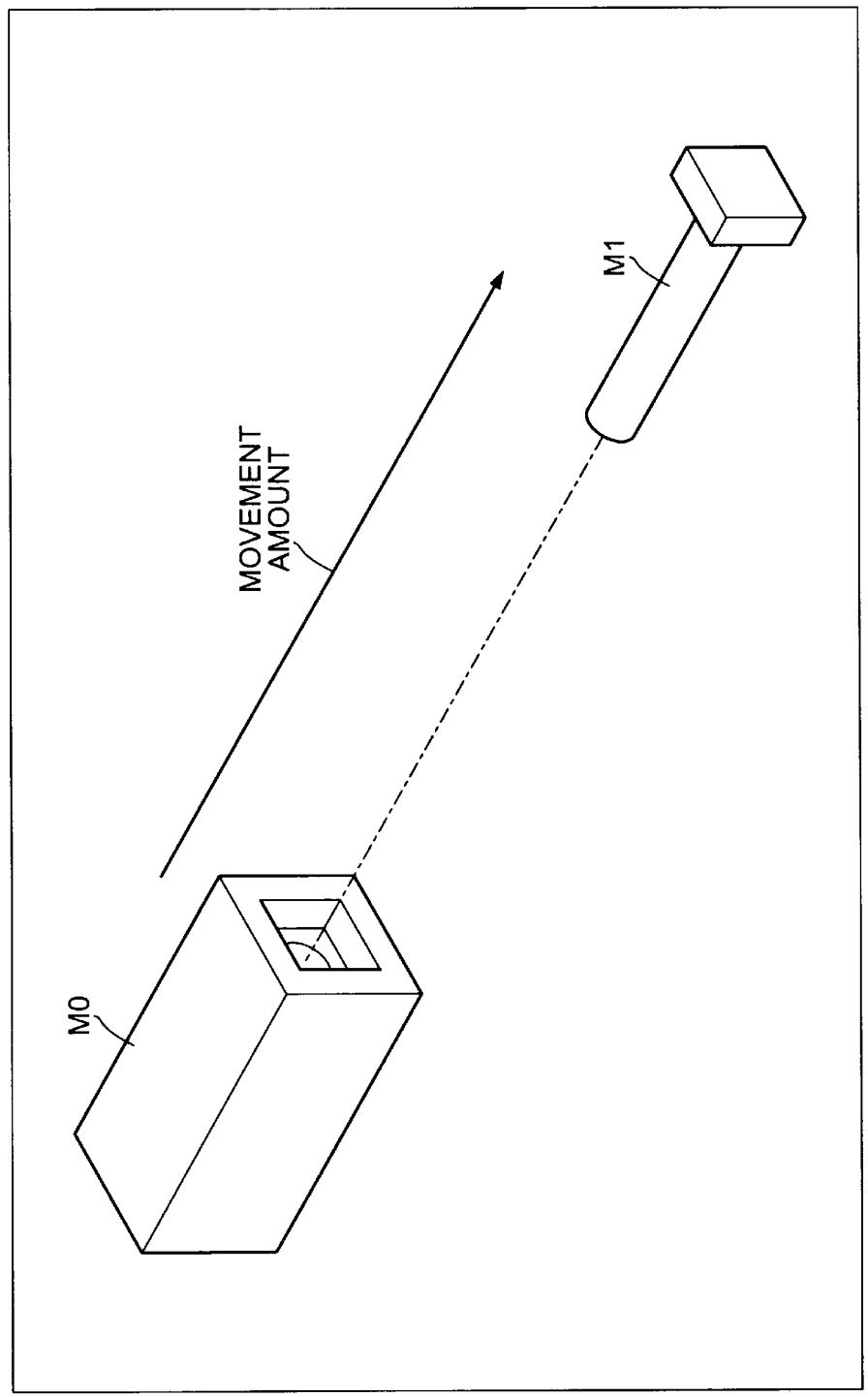

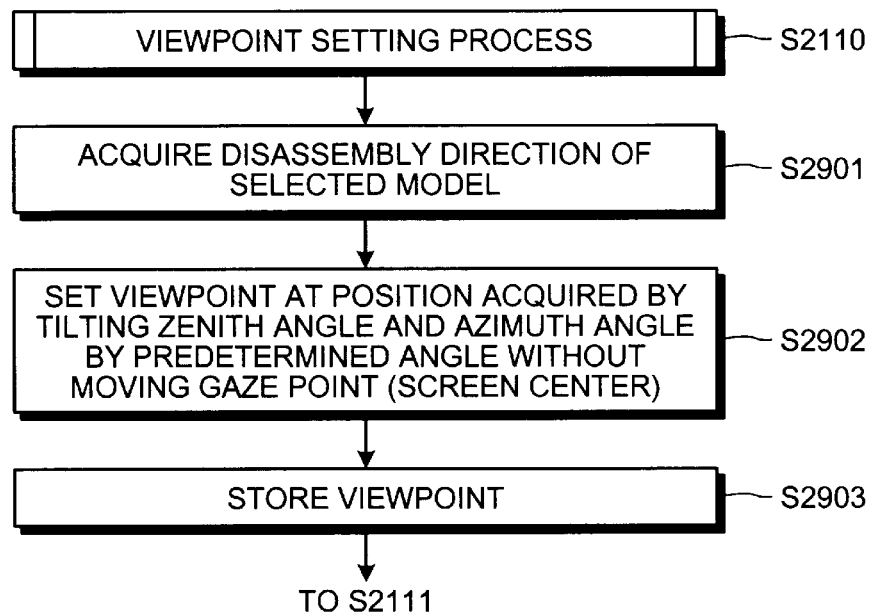
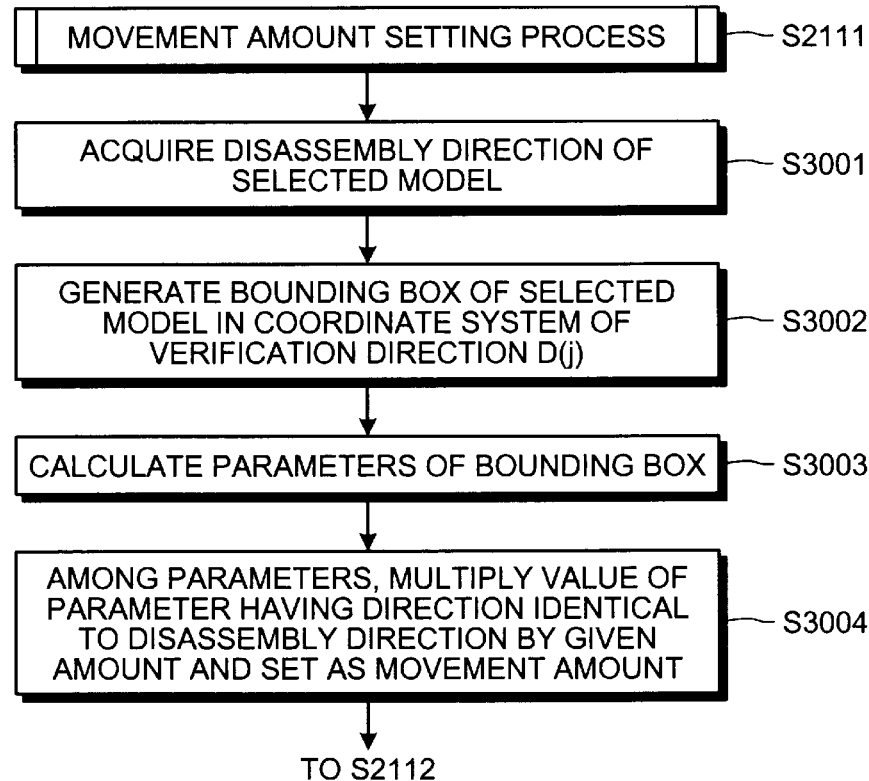

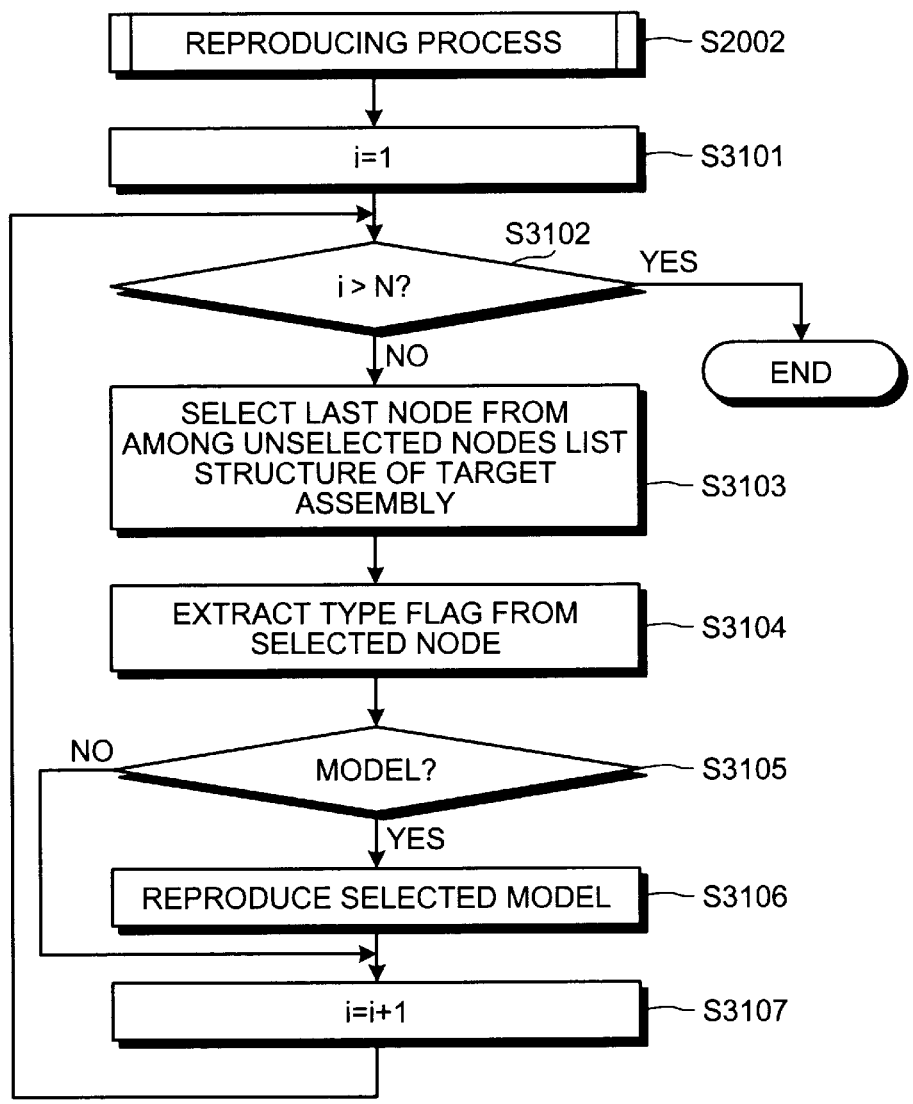

INFORMATION GENERATING PROGRAM, INFORMATION GENERATING METHOD, AND INFORMATION GENERATING APPARATUS

CROSS REFERENCE TO RELATED APPLICATIONS

This application is based upon and claims the benefit of priority of the prior Japanese Patent Application No. 2011-230424, filed on Oct. 20, 2011, the entire contents of which are incorporated herein by reference.

FIELD

The embodiments discussed herein are related to an information generating program, an information generating method, and an information generation apparatus generating information.

BACKGROUND

Conventionally, when generating 3D assembly animation using 3D models, a user must define motions one by one for each component making up a product. For example, a digital appliance, a personal computer (PC), or an office device such as a multifunctional machine has several tens to several thousands of components or, in some cases, several tens of thousands of components. The work involved in generating assembly animation of such a product consumes an immense amount of time.

Therefore, technologies exist that automatically generate assembly animation. Conventional techniques recognized as an automatic creating function for assembly animation using 3D models include a technology (1) in which the user defines a motion of each component to generate animation based on the information.

The conventional technology (1) includes a technique of defining the motion of a 3D model based on disassembly definition information set by the user (see, for example, Japanese Patent No. 4291321). The conventional technology (1) also includes a technique of defining motions based on assembly order, component data, and assembly direction data set by the user (see, for example, Japanese Laid-Open Patent Publication No. H8-106486).

Although assembly animation is automatically generated by the conventional technology (1), motions such as the pull-out direction and movement amount of a component serving as a basis of the animation must be defined. Therefore, a technology (2) exists in which a system automatically defines the motion of a component to generate animation. The conventional technology (2) includes a technique of using an interference check technique to detect the occurrence of interference for six axes of a coordinate system of a component making up the product so as to determine a disassembly direction based on the interpretation that the component can be disassembled in a direction that causes no interference (see, for example, Japanese Laid-Open Patent Publication No. H10-312208).

Nonetheless, since the interference check is performed in the conventional technology (2), a great deal of time is consumed until a result is obtained. For a product scale (several tens of thousands of components) used in actual operation, an immense amount of computation time is consumed to extract an interference result. Therefore, the conventional technology (2) consumes a great deal of time to extract a result, i.e., to generate animation.

The conventional technology (2) has a problem of low versatility. For example, one product includes a multiplicity of components based on the premise that interference occurs at the time of assembly or in the middle of assembly. In many products, interference generating components such as E-rings, clips, and screws account for 70% or more of the components.

An E-ring or a clip is fit to a shaft component in a direction orthogonal to the axial direction of the shaft component. Therefore, if the E-ring or the clip is pulled out from the shaft component, the E-ring or the clip is pulled out in an orthogonal direction instead of the axial direction and therefore, the E-ring or the clip interferes with the shaft component.

A screw may be designed such that a thread groove is not formed on the shaft of a screw or on the inner surface of a screw hole. In this case, the screw is caused to interfere with the screw hole by making the diameter of the screw shaft larger (or smaller) than the diameter of the screw hole. Since interference is caused by E-rings, clips, and screws accounting for the large portion of components, the conventional technology (2) has a problem the components that can be disassembled are limited.

SUMMARY

According to an aspect of an embodiment, a computer-readable recording medium stores a program for causing a computer to execute an information generating process that includes selecting an arbitrary model from a storage device storing assembly data of an assembly assembled from multiple models; projecting in multiple directions, the selected arbitrary model to a first area in a color different from a background color of the first area to generate first projection images, and projecting in the directions and to a second area of the same size as the first area, the arbitrary model in a color different from the background color and another model other than the arbitrary model in the same color as the background color to generate second projection images; comparing among the generated first and second projection images, projection images having identical verification directions selected from among the directions, to calculate a score indicative of a matching degree between the projection images for each of the verification directions; and determining from the assembly data and as a disassembly direction for disassembling the arbitrary model, a direction opposite to the verification direction of the projection image having the highest score among the calculated scores, to associate and store the disassembly direction and the arbitrary model to the storage device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram of an example of a data structure of component information;

FIG. 6 is a diagram of an example of a data structure of assembly information;

FIG. 7 is a diagram of the relative coordinate value and the relative orientation depicted in FIGS. 5 and 6;

FIG. 9 is a diagram of separated manufacturing flows 901 to 907 obtained by separating a manufacturing flow 802 depicted in FIG. 8B based on parent-child relationships;

FIG. 19 is a diagram of an example of a setting of a movement amount;

FIG. 29 is a flowchart of a detailed process procedure of a viewpoint setting process (step S2110) depicted in FIG. 21;

FIG. 30 is a flowchart of a detailed process procedure of a movement amount setting process (step S2111) depicted in FIG. 21; and FIG. 31 is a flowchart of a detailed process procedure of the reproducing process (step S2002) depicted in FIG. 20.

DESCRIPTION OF EMBODIMENTS

Preferred embodiments of an information generating program, an information generating method, and an information generating apparatus according to the present invention will be explained with reference to the accompanying drawings.

Figure 1:
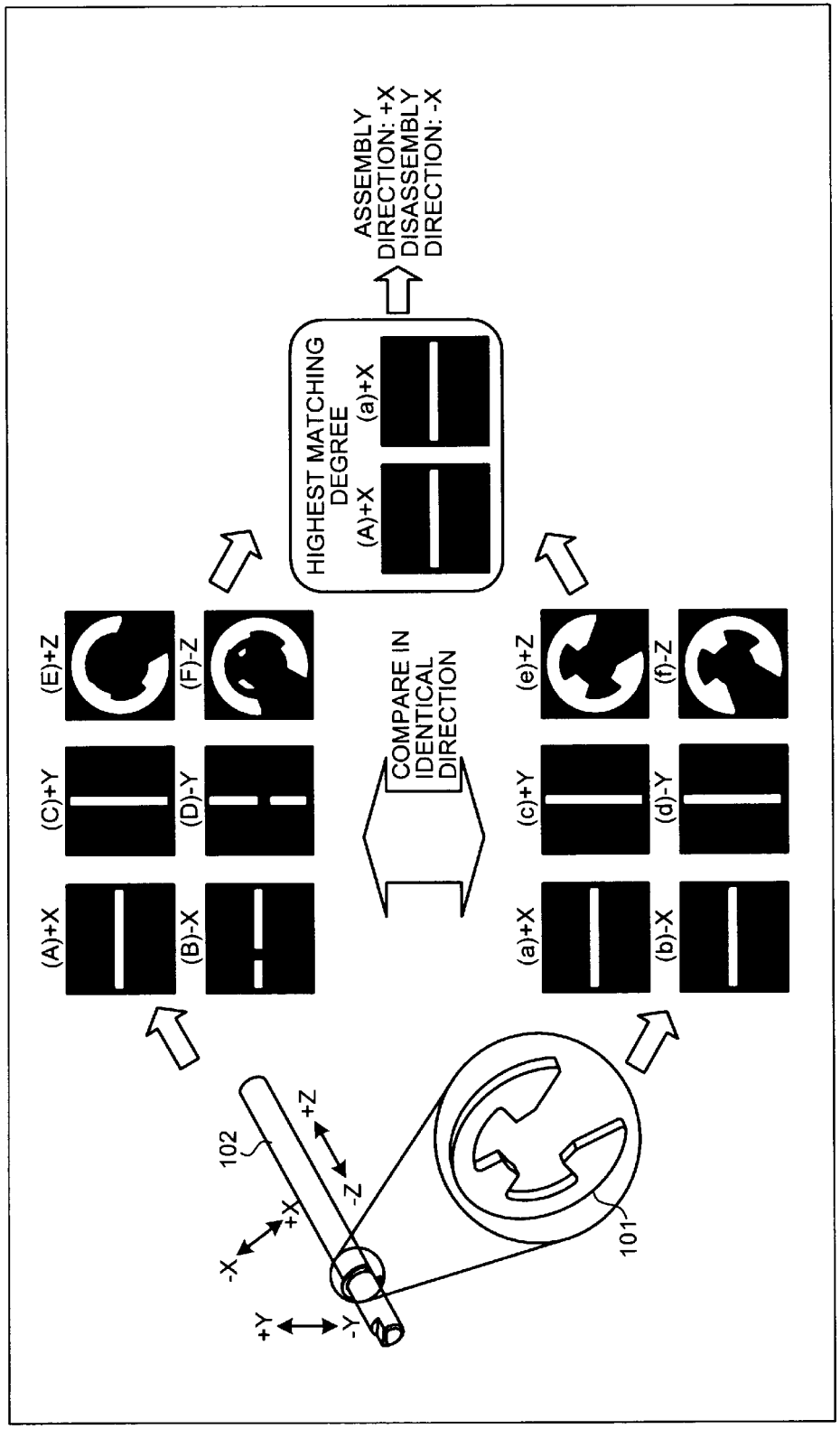
FIG. 1 is a diagram of an example of information generation according to an embodiment.

FIG. 1 is a diagram of an example of information generation according to the embodiment. FIG. 1 depicts an example of assembly data (hereinafter, "assembly") 103 representing an assembly of a shaft 102, which is represented by component data (hereinafter, "component"), and an E-ring 101, which also is represented by component data. The E-ring 101 is not assembled in an axial direction of the shaft 102 (+Z or −Z in FIG. 1) and is assembled in a +X direction orthogonal to the axial direction. The E-ring 101 interferes with the shaft 102 by being attached to the shaft 102. The E-ring 101 is not disassembled in an axial direction of the shaft 102 (+Z or −Z direction in FIG. 1) and is disassembled in a −X direction orthogonal to the axial direction.

In this case, in a conventional interference check, a large computation load is created and the E-ring 101 interferes with the shaft 102 in the assembly direction (+X), the disassembly direction (−X), and the axial directions (+Z, −Z). Therefore, the information generating apparatus generates projection images (a) to (f) of the E-ring 101 with respect to the six directions +X to −Z.

The projection images (a) to (f) are images projected to a bitmap image area of a predetermined size (e.g., 200×200 pixels) at a predetermined magnification. In the present example, the background color of bitmap images is assumed to be black and the color of the object, i.e., the E-ring 101, is assumed to be white. The colors are not limited to the combination of black and white provided the background color and the color of the object differ from one another.

Similarly, the information generating apparatus displays another component, sets the color thereof to black, which is the same as the background color, and generates projection images (A) to (F) of the E-ring 101 from the respective directions. The projection images (A) to (F) are images projected to a bitmap of the same size as the projection images (a) to (f) at the same magnification.

The information generating apparatus compares the projection images (a) to (f) and the projection images (A) to (F), respectively according to direction and, for example, for each of projection image sets {(a),(A)} to {(f),(F)}. The information generating apparatus detects the set having the highest matching degree, i.e., the largest number of matching white bits, and determines the projection direction of the projection image to be the assembly direction. In the case of the example depicted in FIG. 1, the projection image set {(a), (A)} has the highest matching degree and no other obstructive component exists when the E-ring 101 is disassembled. Therefore, the +X direction is determined as the assembly direction and the opposing −X direction is determined as the disassembly direction. As a result, the E-ring 101 is attached to the shaft 102 in the +X direction and can be disassembled in the −X direction.

As described, the information generating apparatus according to the embodiment can detect assembly direction and disassembly direction, which are undetectable in a conventional interference check, for components such as the E-ring 101 included among an immense number of components. Since a conventional interference check is not performed, the information generating apparatus can reduce the computation load. Since the assembly direction and the disassembly direction are detected by a simple comparison of projection images, the information generating apparatus can achieve faster detection speeds. In FIG. 1, although the E-ring 101 is taken as an example, the information generating apparatus is applicable to components, such as clips and screws, that interfere with the assembly counterpart. Therefore, the information generating apparatus is not dependent on the type of product to be assembled and can improve versatility.

Figure 2:
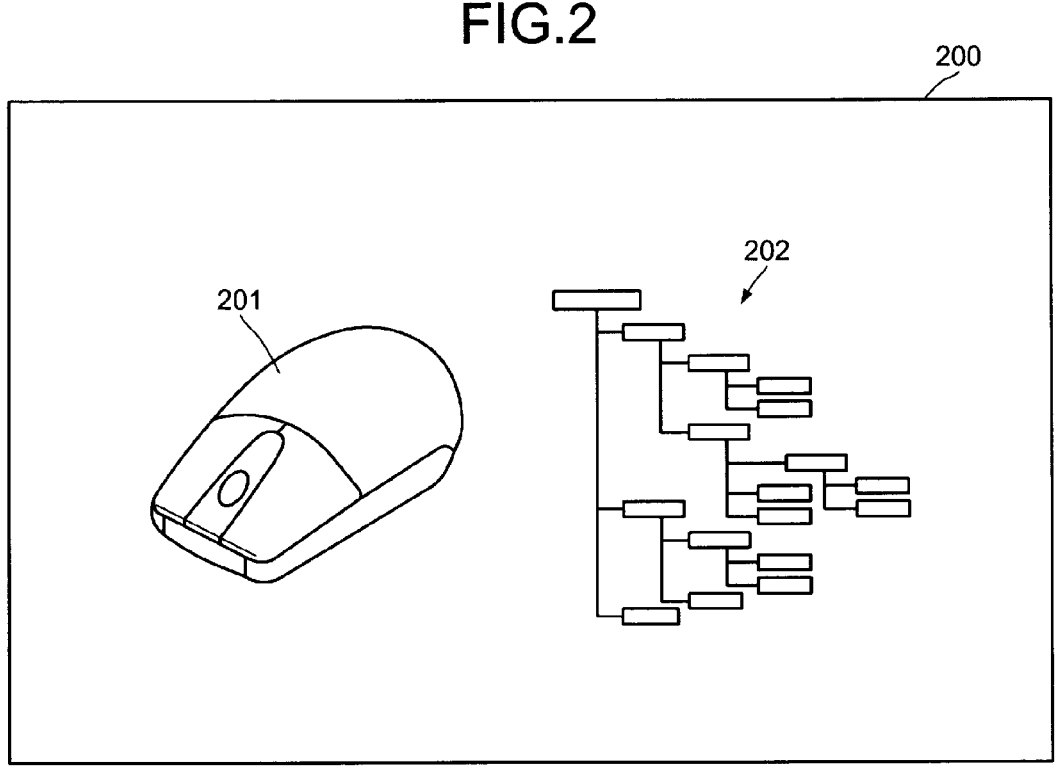
FIG. 2 is a diagram of an example of data input to the information generating apparatus according to the embodiment.

FIG. 2 is a diagram of an example of data input to the information generating apparatus according to the embodiment. Input data 200 is data transmitted from a three-dimensional, computer aided design (CAD) system, for example. FIG. 2 depicts the input data 200 of a mouse as an example.

The input data 200 includes a three-dimensional model 201 of the target product (mouse in FIG. 2) that is to be the subject of information generation, and an assembly tree 202 of the three-dimensional model 201. The assembly tree 202 is hierarchically structured information representing configurations of assemblies and components making up the three-dimensional model 201.

Figure 3:
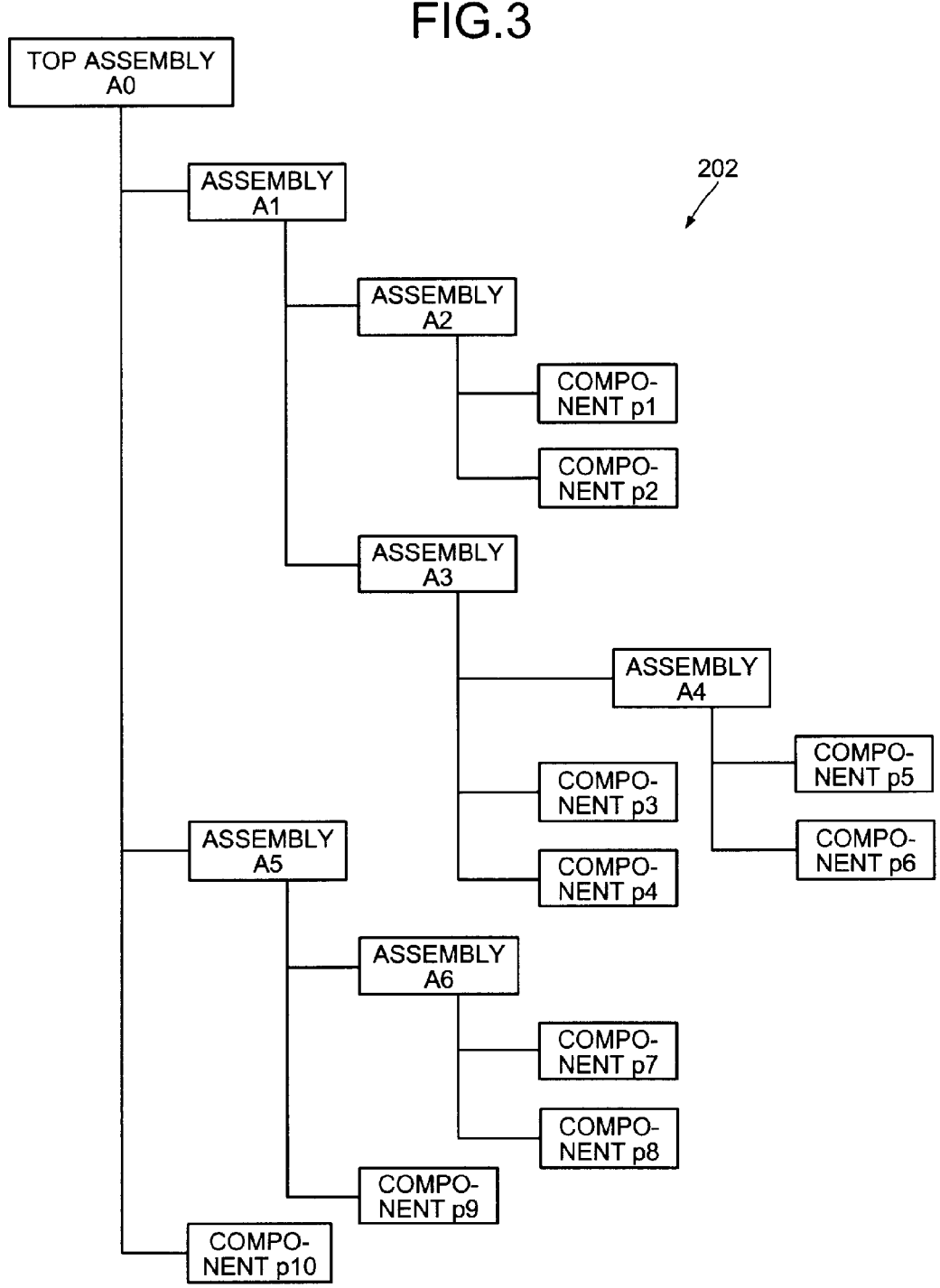
FIG. 3 is a diagram of an example of an assembly tree 202 depicted in FIG. 2.

FIG. 3 is a diagram of an example of the assembly tree 202 depicted in FIG. 2. In FIG. 3, a top assembly A0 represents the three-dimensional model 201 of the mouse. In the example depicted in FIG. 3, the top assembly A0 includes assemblies A1 and A5 and a component p10. Assembly A1 includes assemblies A2 and A3. Assembly A2 includes components p1 and p2.

An assembly in the next higher hierarchy is referred to as a parent assembly. For example, the parent assembly of assembly A2 is assembly A1. An assembly in the next lower hierarchy is referred to as a child assembly. For example, the child assemblies of assembly A1 are the assemblies A2 and A3.

An assembly is a model made up of components and assemblies. A component is a minimum unit model that cannot be further reduced. Therefore, assemblies and components are collectively referred to as a model. Description will hereinafter be made with reference to FIG. 4.

Figure 4:
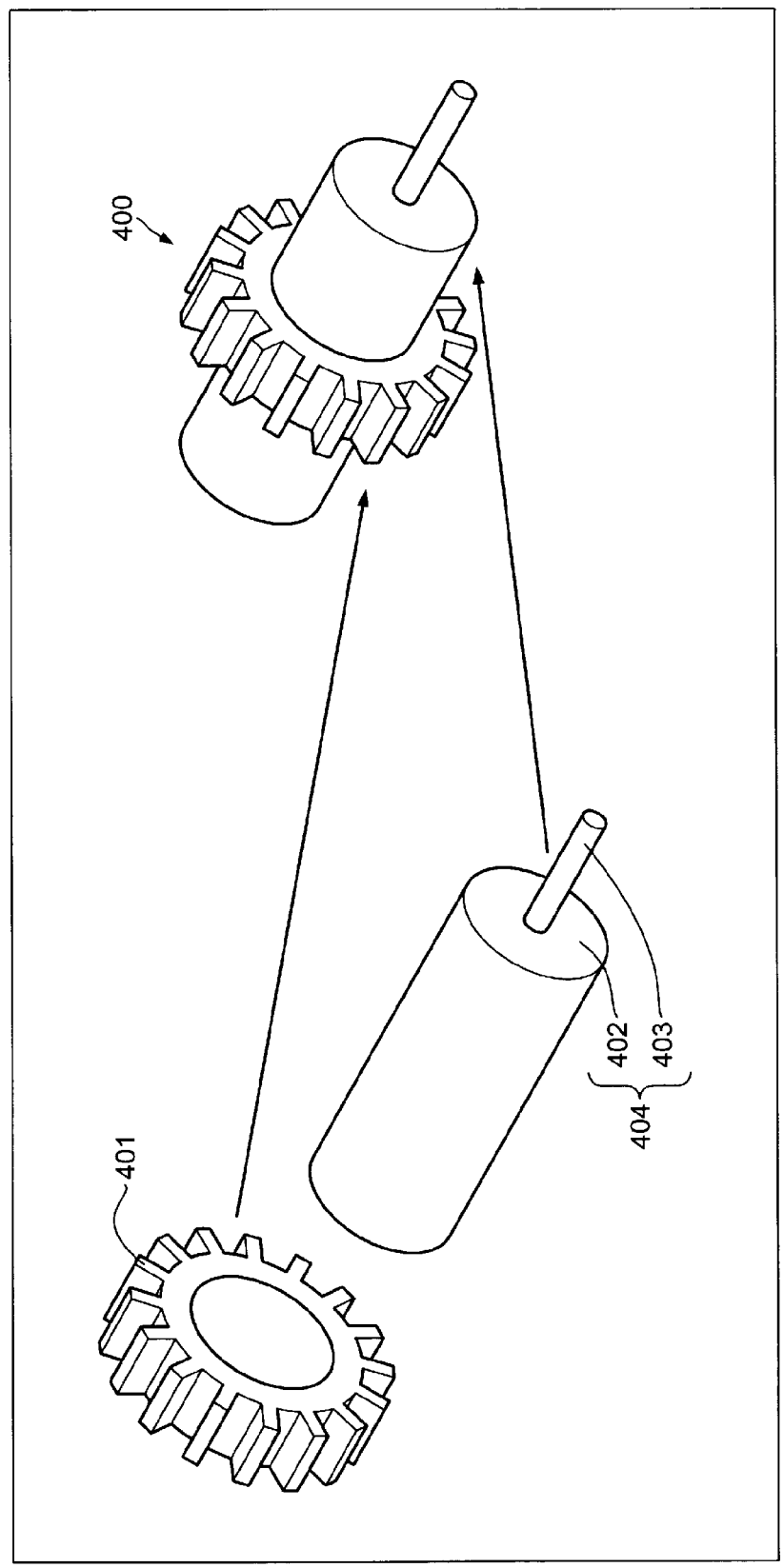
FIG. 4 is a diagram of an example of an assembly.

FIG. 4 is a diagram of an example of an assembly. In FIG. 4, an assembly 400 includes a gear 401 and an assembly 404 of shafts 402 and 403.

FIG. 5 is a diagram of an example of a data structure of component information. Component information 500 is information belonging to components in a three-dimensional model and is information extracted from the input data 200 by the information generating apparatus when the information generating apparatus acquires the input data 200.

In FIG. 5, the component information 500 includes an identification information field, a shape information field, a relative coordinate value field, a relative orientation field, a top-priority direction field, a 6-axis score field, a viewpoint field, and a movement amount field. The identification information field stores identification information uniquely identifying a component. In FIG. 5, pi is stored as the identification information.

The shape information field further includes a facet field and a facet normal vector field. The facet field stores facets of a component. In FIG. 5, ni facets fi-1 to fi-ni are stored. Each of the facets fi-1 to fi-ni is polygon data of a triangle making up the component and has triangle vertex coordinate values based on a local coordinate system of the component. The facet normal vector field stores ni normal vectors vi-1 to vi-ni for the facets fi-1 to fi-ni.

The relative coordinate value field stores a relative coordinate value from an origin of a parent assembly in a local coordinate system of the parent assembly (a global coordinate system if the parent assembly is the top assembly A0). In FIG. 5, a relative coordinate value Ci is stored. The relative orientation field stores a relative orientation Ri from an orientation of a parent assembly in the local coordinate system of the parent assembly (the global coordinate system if the parent assembly is the top assembly A0). The relative orientation Ri is expressed by a 3×3 matrix, for example.

The top-priority direction field includes an assembly direction field and a disassembly direction field. At the stage of acquiring the input data 200, nothing is stored in the assembly direction field and the disassembly direction field. If the assembly direction and the disassembly direction are detected as depicted in FIG. 1, the detected directions are stored. For example, in the component information 500 of the E-ring 101 depicted in FIG. 1, "+X" and "−X" are stored as the assembly direction and the disassembly direction, respectively.

The 6-axis score field includes fields of the axes (+Xl to −Zl) of the local coordinate system and fields of the axes (+Xg to −Zg) of the global coordinate system. At the stage of acquiring the input data 200, nothing is stored in the 6-axis score field, and when 6-axis scores are calculated, the calculated scores are stored. A 6-axis score is an index value indicative of the suitability of each axis as the assembly direction. In this example, a higher score is assumed to indicate better suitability. The calculation of the 6-axis score will be described later.

The viewpoint field stores a viewpoint coordinate value. When a model is moved in a disassembly direction, if the disassembly direction is identical to a viewpoint direction, the movement in the disassembly direction is less visible even when animation of the disassembly state is reproduced. Therefore, a viewpoint coordinate value of a shifted viewpoint position is stored and when the animation of the disassembly state is reproduced, the animation is displayed in the viewpoint direction from the viewpoint coordinate value so as to facilitate visibility.

FIG. 6 is a diagram of an example of a data structure of assembly information. Assembly information 600 is information belonging to assemblies in a three-dimensional model and is information extracted from the input data 200 by the information generating apparatus when the input data 200 is acquired.

In FIG. 6, the assembly information 600 includes an identification information field, an immediately lower constituent model count field, parent assembly identification information, a relative coordinate value field, a relative orientation field, a top-priority direction field, a 6-axis score field, a viewpoint field, and a movement amount field. The fields other than the immediately lower constituent model count field and the parent assembly identification information are the same as those in the component information 500 and will not be described.

The immediately lower constituent model count field stores an immediately lower constituent model count mj. The immediately lower constituent model count is the number of constituent models in the next lower hierarchy of the target assembly. Even if located in the next lower hierarchy, a model other than a constituent model is not counted. For example, in the case of assembly A3 depicted FIG. 3, although assembly A4 and the components p1 to p4, p7, and p8 are in the next lower hierarchy, the constituent models in the next lower hierarchy of assembly A3 are assembly A4 and the components p3 and p4. Therefore, the immediately lower constituent model count mj in the case of assembly A3 is mj=3.

The parent assembly identification information field stores parent assembly identification information Aj. For example, in the case of assembly A3, the parent assembly is assembly A1 and therefore, A1 is stored in the parent assembly identification information field. This enables the information generating apparatus to identify parent-child relationships among the assemblies.

FIG. 7 is a diagram of the relative coordinate value and the relative orientation depicted in FIGS. 5 and 6. In this example, the relative coordinate value and the relative orientation of a model M will be described. In FIG. 7, a global coordinate system including an Xg axis, a Yg axis, and a Zg axis are defined as Cg. Q0 is the origin of the global coordinate system Cg. The global coordinate system Cg is a space for defining a model M0 that is the top assembly A0 depicted in FIG. 3. The coordinate values of facets making up the model M0 are set based on the origin Q0.

Q1 is the origin of a local coordinate system Cl1 including an Xl1 axis, a Yl1 axis, and a Zl1 axis. The local coordinate system Cl1 is a space for defining a model M1 that is assembly A1 having the top assembly A0 depicted in FIG. 3 as the parent assembly, for example. The origin Q1 of the local coordinate system Cl1 is determined by a relative position to the origin Q0 of the global coordinate system Cg. The coordinate values of facets making up the model M1 are set based on the origin Q1. A relative orientation R1 of the local coordinate system Cl1 is a relative orientation from the orientation of the model M0 in the global coordinate system Cg.

Q2 is the origin of a local coordinate system Cl2 including an Xl2 axis, a Yl2 axis, and a Zl2 axis. The local coordinate system Cl2 is a space for defining a model M2 that is assembly A2 having assembly A1 depicted in FIG. 3 as the parent assembly, for example. The origin Q2 of the local coordinate system Cl2 is determined by a relative position to the origin Q1 of the local coordinate system C11. The coordinate values of facets making up the model M2 are set based on the origin Q2. A relative orientation R2 of the local coordinate system Cl1 is a relative orientation from the orientation of the model M1 in the local coordinate system Cl1.

As described above, a relative coordinate value of a model is determined based on an origin determined by a relative position from the origin of the parent assembly, and an orientation of a model is set based on the orientation of the parent assembly.

Figure 8A:
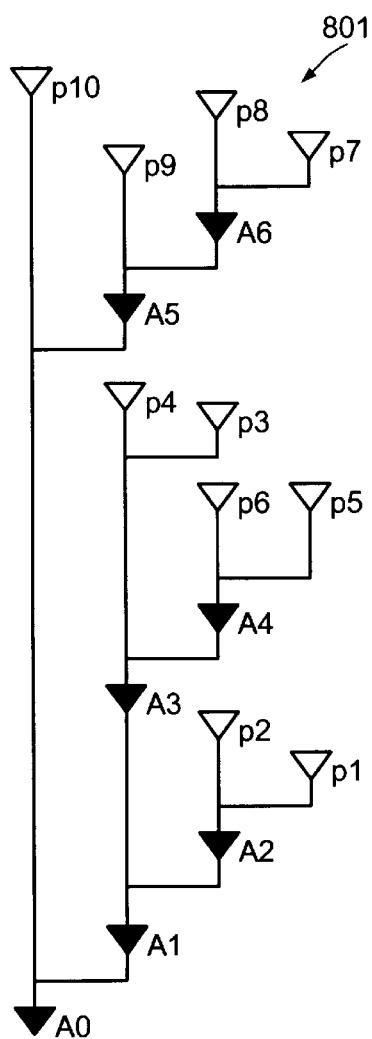
FIGS. 8A and 8B are explanatory views of a conversion example of the assembly tree 202.
Figure 8B:
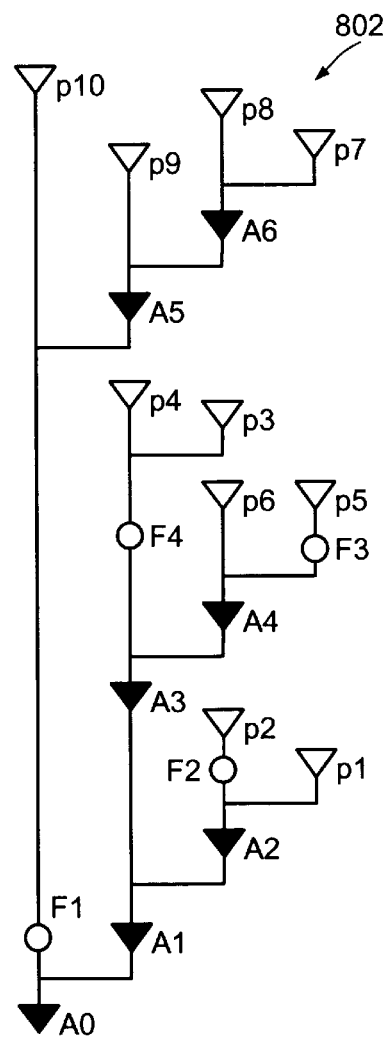

FIGS. 8A and 8B are explanatory views of a conversion example of the assembly tree 202. FIG. 8A depicts a state of the assembly tree 202 depicted in FIG. 3 converted into an equivalent manufacturing flow 801. The conversion into the manufacturing flow 801 may be performed manually or automatically. In the manufacturing flow 801 depicted in FIG. 8A, the top-to-bottom direction indicates assembly order such as combining the components p7 and p8 into assembly A6 and combining the component p9 and assembly A6 into assembly A5, for example. Therefore, the opposite bottom-to-top direction indicates disassembly order.

In a manufacturing flow 802 depicted in FIG. 8B, processes are inserted at desired positions. The processes are inserted via user operation. The processes indicate operations necessary for assembling. For example, in FIG. 8B, the component p2 is subjected to a process F2 and then combined with the component p1 to obtain assembly A2.

FIG. 9 is a diagram of separated manufacturing flows 901 to 907 obtained by separating the manufacturing flow 802 depicted in FIG. 8B based on parent-child relationships. For example, the separated manufacturing flow 902 is a flow depicting assembly of the assemblies A2 and A3 to generate assembly A1. The separated manufacturing flow 903 is a flow depicting assembly of the components p1 and p2 to generate assembly A2.

A data structure of the manufacturing flow 802 will be described. In the embodiment, as an example, the component information 500 and the assembly information 600 described above are managed in a list structure that links nodes.

Figure 10:
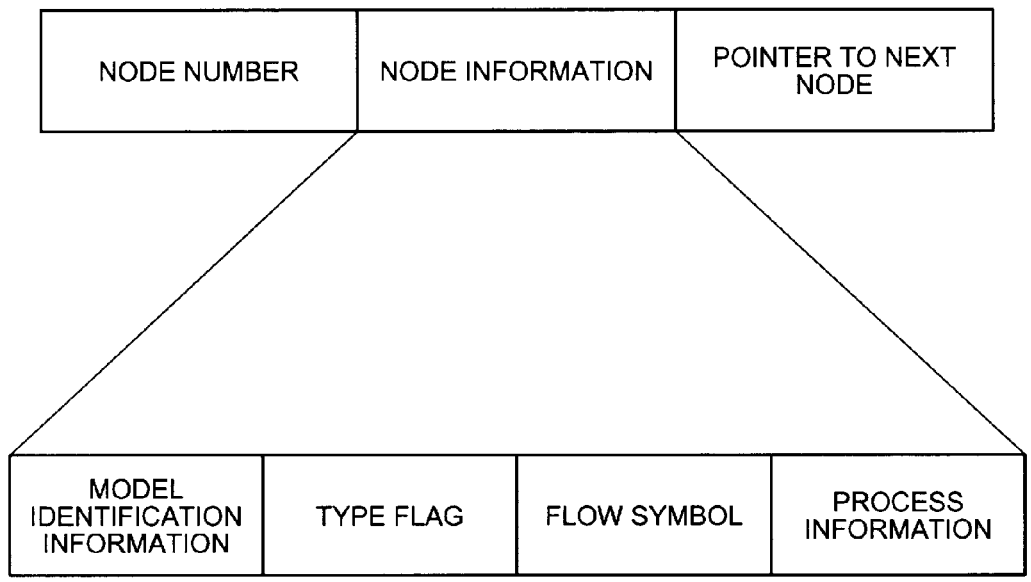
FIG. 10 is a diagram of an example of a data structure of a node.

FIG. 10 is a diagram of an example of a data structure of a node. In FIG. 10, a node includes a node number, node information, and a pointer to next node. The node number is a number indicative of assembly order and is assigned sequentially from one according to the manufacturing flow 802. The ascending order of the node number indicates the assembly order and the reverse order thereof indicates the disassembly order.

The node information includes model identification information, a type flag, a flow symbol, and process information. The model identification information is identification information of the component or the assembly corresponding to the node. The model identification information can be used as a pointer to specify the component information 500 or the assembly information 600.

The type flag is a flag identifying the type (component, assembly, and process) of the node. For example, the type flags of component, assembly, and process are "0", "1", and "2", respectively. The flow symbol is a symbol depicted in FIG. 8. The process information is a character string indicative of details of a process if the type of the node is "process". The character string is input via user operation The pointer to next node stores the node number of the next node. As a result, the next node can be specified. A node is also specified from the next node. If the next node does not exist, the node is the last node and therefore, "NULL" is stored.

Figure 11:
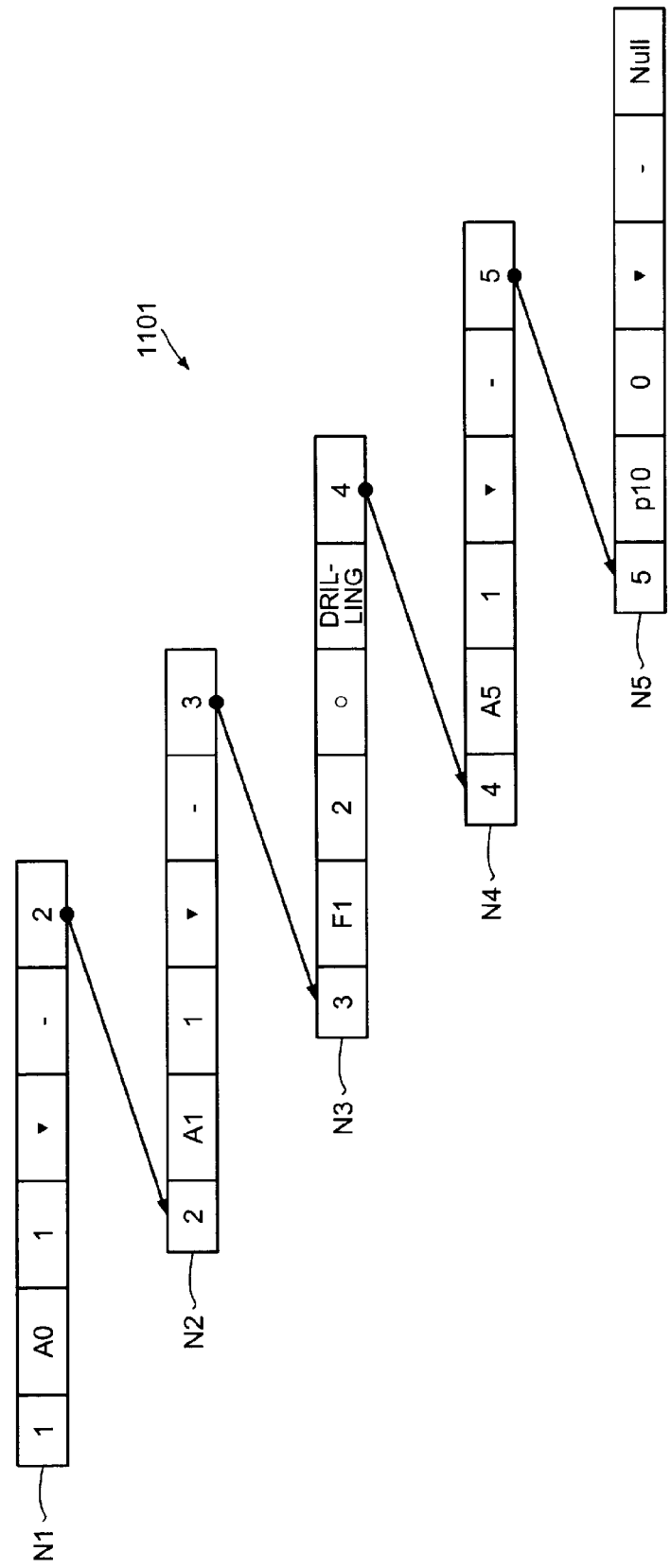
FIG. 11 is a diagram of an example of a list structure of a separated manufacturing flow.

FIG. 11 is a diagram of an example of a list structure of a separated manufacturing flow. A list structure 1101 depicted in FIG. 11 is a list structure of the separated manufacturing flow 901 depicted in FIG. 9 and nodes N1 to N5 are concatenated.

Figure 12:
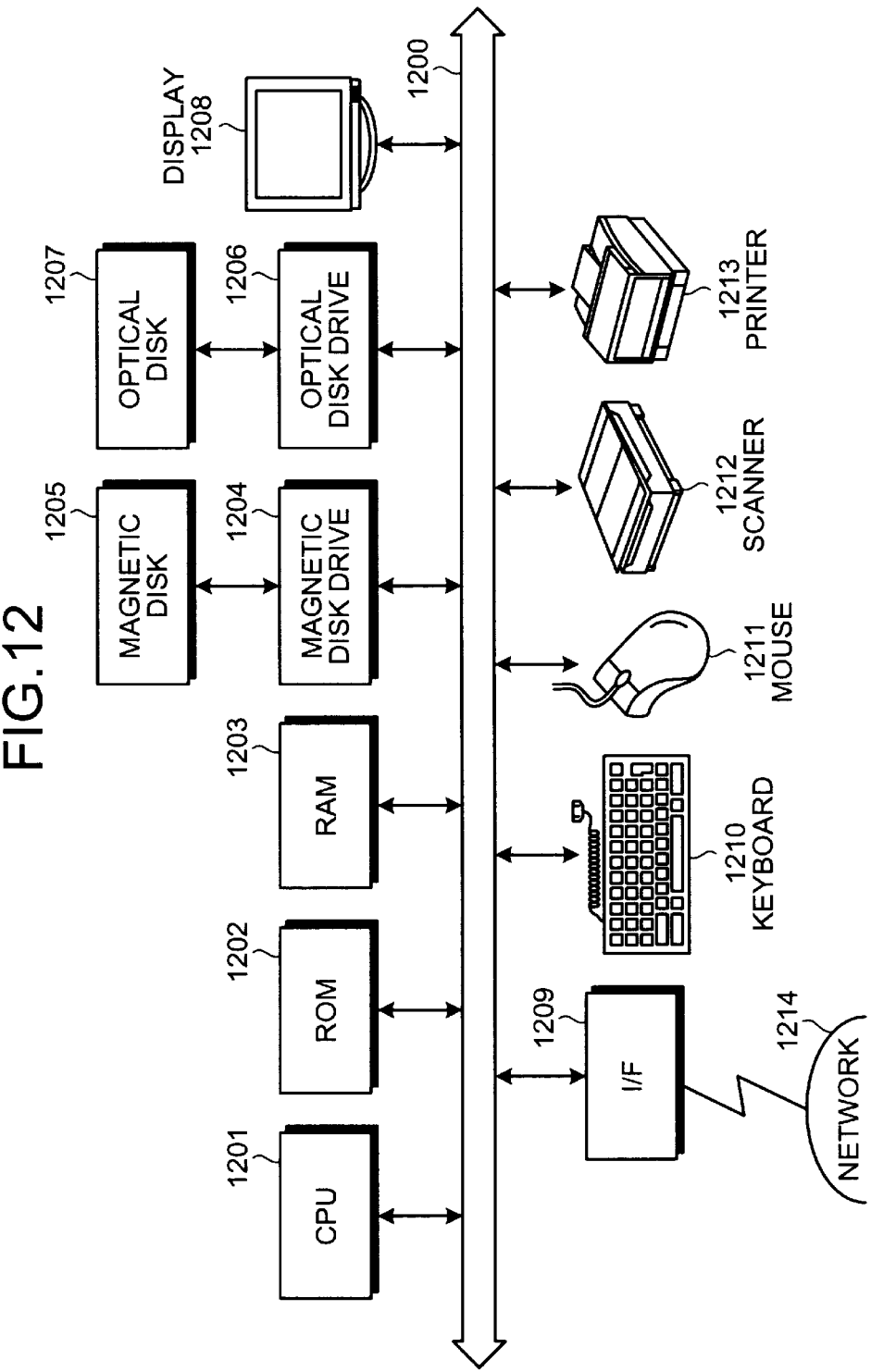
FIG. 12 is a block diagram of a hardware configuration of the information generating apparatus according to the embodiment.

FIG. 12 is a block diagram of a hardware configuration of the information generating apparatus according to the embodiment. As depicted in FIG. 12, the information generating apparatus includes a central processing unit (CPU) 1201, a read-only memory (ROM) 1202, a random access memory (RAM) 1203, a magnetic disk drive 1204, a magnetic disk 1205, an optical disk drive 1206, an optical disk 1207, a display 1208, an interface (I/F) 1209, a keyboard 1210, a mouse 1211, a scanner 1212, and a printer 1213, respectively connected by a bus 1200.

The CPU 1201 governs overall control of the information generating apparatus. The ROM 1202 stores therein programs such as a boot program. The RAM 1203 is used as a work area of the CPU 1201. The magnetic disk drive 1204, under the control of the CPU 1201, controls the reading and writing of data with respect to the magnetic disk 1205. The magnetic disk 1205 stores therein data written under control of the magnetic disk drive 1204.

The optical disk drive 1206, under the control of the CPU 1201, controls the reading and writing of data with respect to the optical disk 1207. The optical disk 1207 stores therein data written under control of the optical disk drive 1206, the data being read by a computer.

The display 1208 displays, for example, data such as text, images, functional information, etc., in addition to a cursor, icons, and/or tool boxes. A liquid crystal display, a plasma display, and the like may be employed as the display 1208.

The I/F 1209 is connected to a network 1214 such as a local area network (LAN), a wide area network (WAN), and the Internet through a communication line and is connected to other apparatuses through the network 1214. The I/F 1209 administers an internal interface with the network 1214 and controls the input/output of data from/to external apparatuses. For example, a modem or a LAN adaptor may be employed as the I/F 1209.

The keyboard 1210 includes, for example, keys for inputting letters, numerals, and various instructions and performs the input of data. Alternatively, a touch-panel-type input pad or numeric keypad, and the like may be adopted. The mouse 1211 is used to move the cursor, select a region, or move and change the size of windows. A track ball or a joy stick may be adopted provided each respectively has a function similar to a pointing device.

The scanner 1212 optically reads an image and takes in the image data into the information generating apparatus. The scanner 1212 may have an optical character reader (OCR) function as well. The printer 1213 prints image data and text data. The printer 1213 may be, for example, a laser printer or an ink jet printer.

Figure 13:
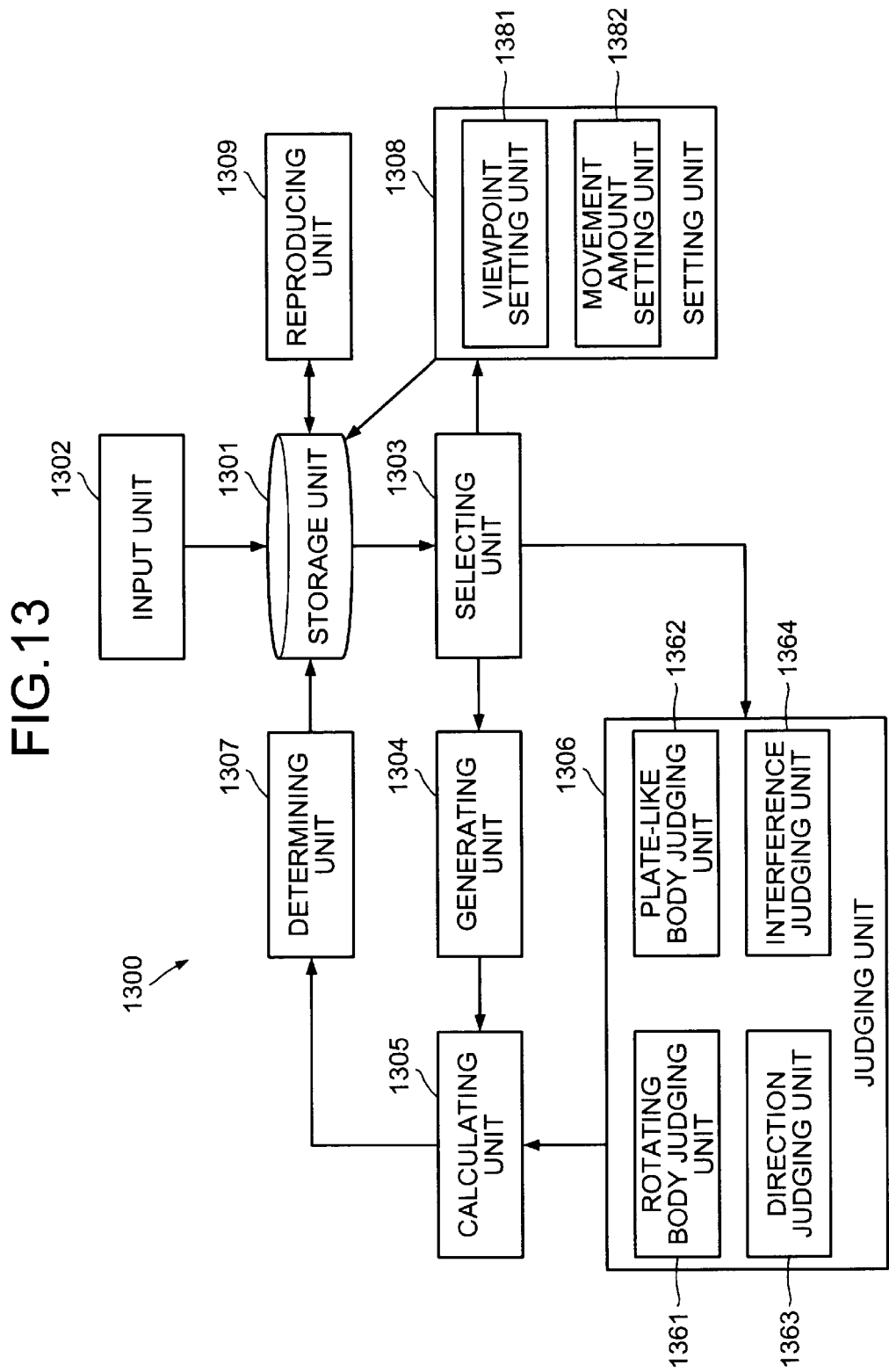
FIG. 13 is a block diagram of an example of a functional configuration of an information generating apparatus 1300.

FIG. 13 is a block diagram of an example of a functional configuration of an information generating apparatus 1300. The information generating apparatus 1300 includes a storage unit 1301, an input unit 1302, a selecting unit 1303, a generating unit 1304, a calculating unit 1305, a judging unit 1306, a determining unit 1307, a setting unit 1308, and a reproducing unit 1309.

For example, the function of the storage unit 1301 is implemented by a storage device such as the ROM 1202, the RAM 1203, the magnetic disk 1205, and the optical disk 1207 depicted in FIG. 12. For example, the functions of the input unit 1302 to the reproducing unit 1309 are implemented by the CPU 1201 executing programs stored in a storage device such as the ROM 1202, the RAM 1203, the magnetic disk 1205, and the optical disk 1207 depicted in FIG. 12, or by the I/F 1209.

The input unit 1302 receives data input. For example, the input unit 1302 receives the input of the three-dimensional model 201 and the assembly tree 202 as depicted in FIG. 2. The input data 200 is stored to the storage unit 1301. The storage unit 1301 is assumed to subsequently store the component information 500 depicted in FIG. 5, the assembly information 600 depicted in FIG. 6, the manufacturing flow depicted in FIG. 8B, and the list structure depicted in FIG. 11.

The selecting unit 1303 selects a model from the storage device storing an assembly assembled from multiple models. In this example, a list structure of a separated manufacturing flow to be processed is assumed to have been specified. The selecting unit 1303 sequentially selects the models from the last node of the list structure.

For example, in the case of the list structure 1101 depicted in FIG. 11, the selecting unit 1303 sequentially selects models beginning from the last node N5 and thus, selects the component p10 1 and then selects assembly A5 of the node N4. Since the next node N3 is a process, no selection is made, and the selecting unit 1303 selects assembly A1 of the node N2. After selection has been made from the leading node N1, the selecting operation ends since no models to be selected remain.

The generating unit 1304 projects the model selected by the selecting unit 1303 to a first area in a color different from the background color of the first area in multiple directions to generate first projection images. For example, the generating unit 1304 respectively generates the first projection images of the selected model in the six directions (+Xl to −Zl) of the local coordinate system and the six directions (+Xg to −Zg) of the global coordinate system. The first area acting as the projection area is a bitmap image area of a predetermined size (e.g., 200×200 pixels) as depicted in FIG. 1, for example. If the local coordinate system is identical to the global coordinate system, the generating unit 1304 generates the projection images in the six directions of either coordinate system, thereby preventing redundant processing from being performed and increasing the speed of processing.

If the local coordinate system is identical to the global coordinate system, the generating unit 1304 generates the projection images (a) to (f) as the first projection images as depicted in FIG. 1. In this case, the selected model (the E-ring 101) is projected in a color (white) different from the background color (e.g., black). Therefore, the bits of projected portions of the selected model are counted. The local coordinate system may not be identical to the global coordinate system. For example, in the global coordinate system, a model may obliquely be assembled relative to the local coordinate system of the model. In such a case, the first and the second projection images are generated in 12 directions, respectively.

The generating unit 1304 projects the selected model to a second area of an identical size to the first area, sets the color of the selected model to a color different from the background color, sets models other than the selected model to the same color as the background, and thereby, generating the second projection images. For example, the generating unit 1304 respectively generates the second projection images of the selected model in the six directions (+Xl to −Zl) of the local coordinate system and the six directions (+Xg to −Zg) of the global coordinate system. The second area acting as a projection area and having the same size as the first area is a bitmap image area of a predetermined size (e.g., 200×200 pixels) depicted in FIG. 1, for example. If the local coordinate system is identical to the global coordinate system, the generating unit 1304 generates the projection images in the six directions of either coordinate system, thereby preventing redundant processing from being performed and increasing the speed of processing.

Similarly, if the local coordinate system is identical to the global coordinate system, the generating unit 1304 generates projection images (A) to (F) as the second projection images as depicted in FIG. 1. In this case, the selected model (e.g., the E-ring 101 depicted in FIG. 1) is projected in a color (white) different from the background color (e.g., black) and another model (e.g., the shaft 102 depicted in FIG. 1) is projected in the background color. Therefore, the bits of projected portions of the selected model in an interference state are counted.

The calculating unit 1305 compares the first and the second projection images generated by the generating unit 1304. The calculating unit 1305 compares projected images having the same verification direction that is selected from among multiple directions. The calculating unit 1305 thereby calculates a score indicative of a matching degree between the projection images for each verification direction. Details will be described with reference to FIG. 1. In this description, the coordinate system depicted in FIG. 1 is considered a local coordinate system.

The verification direction selected from among multiple directions is a direction sequentially selected from +X to −Z in the case depicted in FIG. 1. The calculating unit 1305 compares the projection images having the same verification direction. For example, if the verification direction is +X, the calculating unit 1305 compares the projection images (a) and (A), and if the verification direction is −X, the calculating unit 1305 compares the projection images (b) and (B). For example, the comparison is made as follows.

Below are count results WB1 of the number of white bits representative of the E-ring that is the selected model in the projection images (a) to (f) in FIG. 1.

WB1($a$)=2000
WB1($b$)=2000
WB1($c$)=2000
WB1($d$)=2000
WB1($e$)=13000
WB1($f$)=13000

Below are count results WB2 of the number of white bits representative of the E-ring that is the selected model in the projection images (A) to (F) in FIG. 1.
WB2(A)=2000
WB2(B)=1700
WB2(C)=2000
WB2(D)=1700
WB2(E)=9000
WB2(F)=9500

The calculating unit 1305 calculates a score between the results of the same direction. By way of example, the score is calculated by the following Equation (1).

$$\text{score } Bp = (WB1/WB2) \times 100 \quad (1)$$

Therefore, scores Bp for each verification direction are as follows.
Bp(+Xl)=100
Bp(−Xl)=85
Bp(+Yl)=100
Bp(−Yl)=85
Bp(+Zl)=70
Bp(−Zl)=73

Since the second projection images represent an interference state with another model and an interference portion is indicated by black bits, the score Bp is a score equal to or less than 100. When the interference state is not generated in the second projection image, the score Bp is the maximum score of 100. Therefore, when the score Bp is higher, the number of matches becomes higher between the projected locations (white bits) of the selected model in the first projection image and the projected locations (white bits) of the selected model in the second projection image. In other words, a higher number of matches means fewer locations of interference with the selected model in the direction opposite to the verification direction. Therefore, the selected model is more likely to be pulled out in the direction opposite to the verification direction. In the example described above, since the score Bp is 100 in both the +X direction and the +Y direction, this indicates that the selected model is likely to be disassembled in the opposite direction, i.e., the −X direction or the −Y direction.

The judging unit 1306 has a rotating body judging unit 1361, a plate-like body judging unit 1362, a direction judging unit 1363, and an interference judging unit 1364. Through the judgments performed by the rotating body judging unit 1361 to the interference judging unit 1364, the judging unit increases or decreases the score Bp. The rotating body judging unit 1361 to the interference judging unit 1364 are arbitrarily implemented. For example, the rotating body judging unit 1361 to the interference judging unit 1364 may all be implemented, or at least one of the units may be implemented. In other cases, none of the units may be implemented.

The rotating body judging unit 1361 will be described. The rotating body judgment is made as a condition for increasing the score Bp since "with regard to an assembly direction of a model having a shape of a rotating body, the model has a high rate of being assembled in the rotational axis direction" in actual assembly operation. If the selected model is judged to be a rotating body when viewed in the verification direction, the current viewpoint direction, i.e., the verification direction, is the rotational axis direction. The details of the rotating body judgment will hereinafter be described.

The rotating body judging unit 1361 judges whether the selected model is a rotating body based on the dimensions of a rectangle circumscribing a projection image of the selected model projected in the verification direction and the dimensions of a rectangle circumscribing a rotated projection image when the projected image is rotated by a predetermined angle.

For example, the rotating body judging unit 1361 calculates a bounding box of the selected model in the coordinate system of the verification direction. The coordinate system of the verification direction is the local coordinate system of the selected model if the verification direction is +Xl to −Zl and is the global coordinate system of the selected model if the verification direction is +Xg to −Zg. The bounding box is a rectangular parallelepiped circumscribing the selected model.

The rotating body judging unit 1361 projects the bounding box to a projection plane of two axes orthogonal to the verification direction to generate a projection image. For example, if the verification direction is +Xl, the rotating body judging unit 1361 projects the bounding box to the projection plane including +Yl and +Zl orthogonal to +Xl. The rotating body judging unit 1361 defines a vertical length and a horizontal length of the projection image of the bounding box as V and H, respectively, to obtain an aspect ratio V/H.

The rotating body judging unit 1361 generates projection images of the rotated selected model when the projection image of the selected model projected along with the bounding box is rotated counterclockwise (or clockwise) by 0, 15, 30, and 45 degrees using the center of the projection image as the rotation center. Although the projection image is rotated thrice by 15 degrees, a user can arbitrarily set the incremental angle and the number of rotations.

When the projection image of the selected model is rotated, the projection image of the bounding box circumscribing the selected model is changed in the vertical length H and the horizontal length H. If a change in the aspect ratio V/H due to the rotation falls within an acceptable range, the selected model is judged to be a rotating body.

Figure 14A:
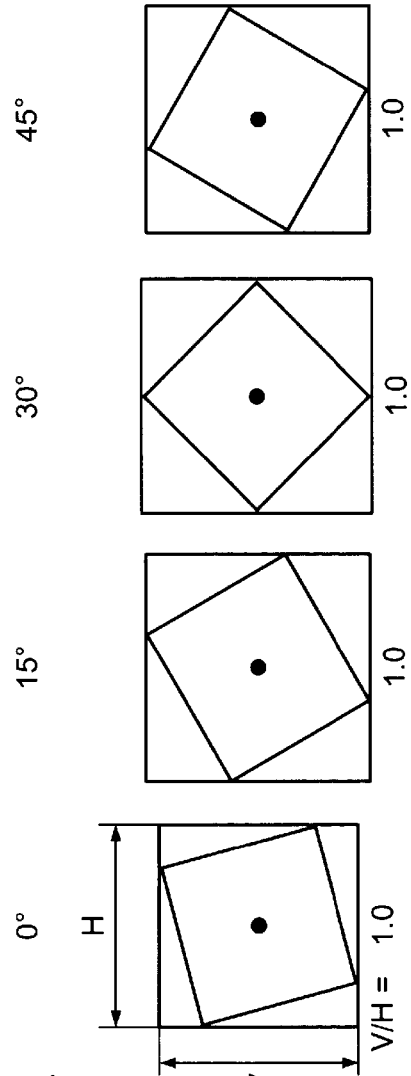
FIGS. 14A, 14B and 14C are explanatory views of examples of a rotating body judgment.
Figure 14B:
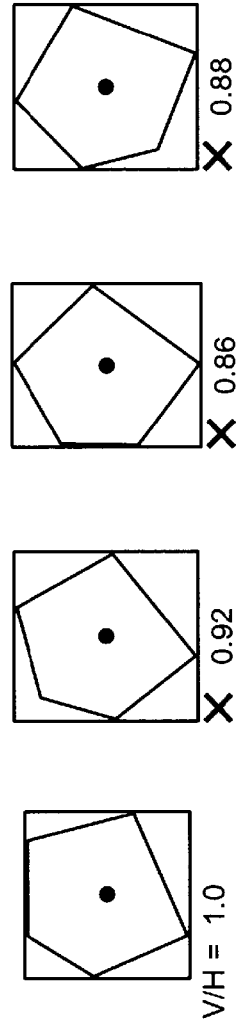
Figure 14C:
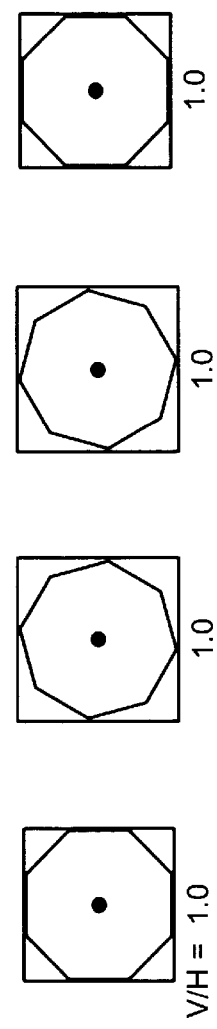

FIGS. 14A, 14B, 14C are explanatory views of examples of the rotating body judgment. FIG. 14A is an example when the projection image of the selected model is a square; FIG. 14B is an example when the projection image of the selected model is a pentagon; and FIG. 14C is an example when the projection image of the selected model is a regular octagon.

In FIGS. 14A and 14C, the aspect ratio V/H is 1.0 at each rotation angle and therefore, the selected model is judged to be a rotating body. In contrast, in FIG. 14B, since the aspect ratio V/H is out of an acceptable range (1.0±0.05) at the rotation angles of 15, 30, and 45 degrees, it is judged that the selected model is not a rotating body. In this example, although it is judged that the selected model is not a rotating body if the aspect ratio V/H is out of the acceptable range at all the rotation angles of 15, 30, and 45 degrees, the selected model may be judged to not be a rotating body if at least one angle causes the aspect ratio V/H to be outside the acceptable range.

If the selected model is judged to be a rotating body, the calculating unit 1305 adds an additional score Ap1 of the selected model to the score Bp.

The plate-like body judging unit 1362 will be described. The plate-like body judgment is made because "a direction normal to a plate surface is desirable in terms of support at the time of assembly (grabbing with arms) and position adjustment" in actual assembly operation. The details of the plate-like body judgment will hereinafter be described.

The plate-like body judging unit 1362 judges whether the selected model is a plate-like body assembled in the verification direction based on the length of the selected model in the verification direction and the length in a direction other than the verification direction and the opposite direction thereof among multiple directions. For example, the plate-like body judging unit 1362 calculates a bounding box of the selected model in the coordinate system of the verification direction.

Figure 15:
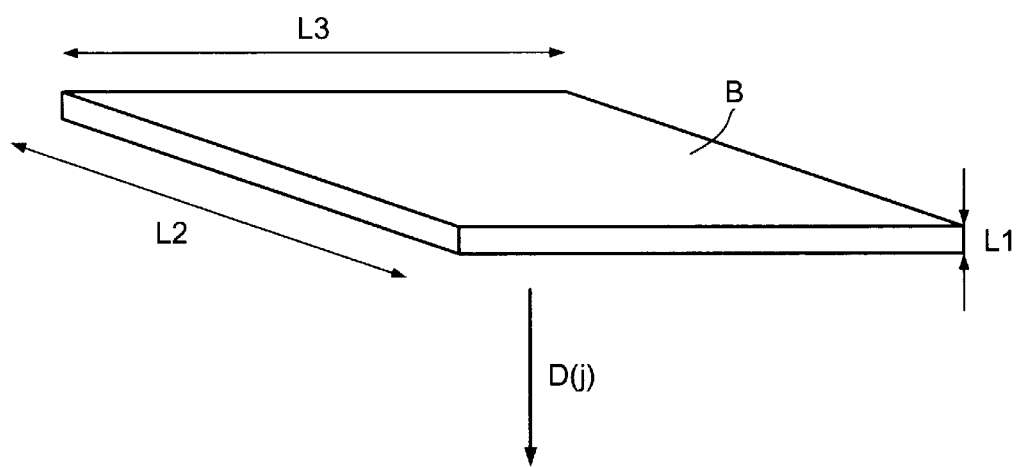
FIG. 15 is an explanatory view of an example of a plate-like body judgment.

The plate-like body judging unit 1362 obtains the lengths of the bounding box in three axial directions defined in the coordinate system of the verification direction. The plate-like body judging unit 1362 judges whether the lengths in the directions of two axes other than the verification direction are equal to a predetermined multiple of (e.g., 20 times longer than) the length in the verification direction. If the lengths are equal to or greater than the predetermined multiple, the selected model is judged to be a plate-like body FIG. 15 is an explanatory view of an example of the plate-like body judgment. In FIG. 15, B denotes a bounding box of a selected model and D(j) denotes a verification direction. L1 to L3 denote the lengths of the bounding box B in the axial directions of the coordinate system of the verification direction D(j). L1 denotes a length in the verification direction D(j). In this case, if L2 and L3 have lengths equal to or greater than a predetermined multiple of L1, the selected model used for the calculation of the bounding box B is judged to be a plate-like body.

If the selected model is judged to be a plate-like body, the calculating unit 1305 adds an additional score Ap2 to the score Bp.

The direction judging unit 1363 will be described. The direction judgment is made as a score-increasing process based on the concept that a score is increased when unnecessary rotation and reversal of a model of the assembly destination is avoided since it is preferred that the same assembly direction be continuously used in consideration of "assembly operation". Therefore, the direction judging unit 1363 checks the disassembly direction determined for the previously-selected model from the component information 500 or the assembly information 600 of the previously-selected model. If the disassembly direction is opposite to the verification direction, the calculating unit 1305 adds an additional score Ap3 to the score Bp.

The interference judging unit 1364 will be described. The interference judgment is made as a process of improving the determination accuracy of the disassembly direction although occurrence of interference itself is not a direct factor for the possibility of assembly or the possibility of disassembly. The interference judgment is particularly effective when a model shape is a concave shape as in the case of the E-ring 101 frequently used in industrial products or a slide component of a curtain rail. Even when a model having such a shape is seemingly disassembled in an axial direction of a ring (or assembled in the axial direction), if the model is pulled out in a direction orthogonal to the axis (or assembled in an orthogonal direction) in actual assembling, the determination accuracy of the pull-out direction (disassembly direction) can be improved. The details of the interference judgment will hereinafter be described.

The interference judging unit 1364 moves the selected model in the direction opposite to the verification direction by a predetermined amount not exceeding the length of the verification model in the verification direction to determine whether interference occurs before and after the movement. For example, the interference judging unit 1364 obtains a bounding box of the selected model in the coordinate system of the verification direction. The interference judging unit 1364 calculates parameters (height, width, and depth) from the bounding box. The interference judging unit 1364 moves the selected model in the disassembly direction opposite to the verification direction by ¼ or ½ of the length of the value of the parameter having the same direction as the verification direction among the parameters. The interference judging unit 1364 performs the interference check for the selected model before the movement and the selected model after the movement.

Figure 16A:
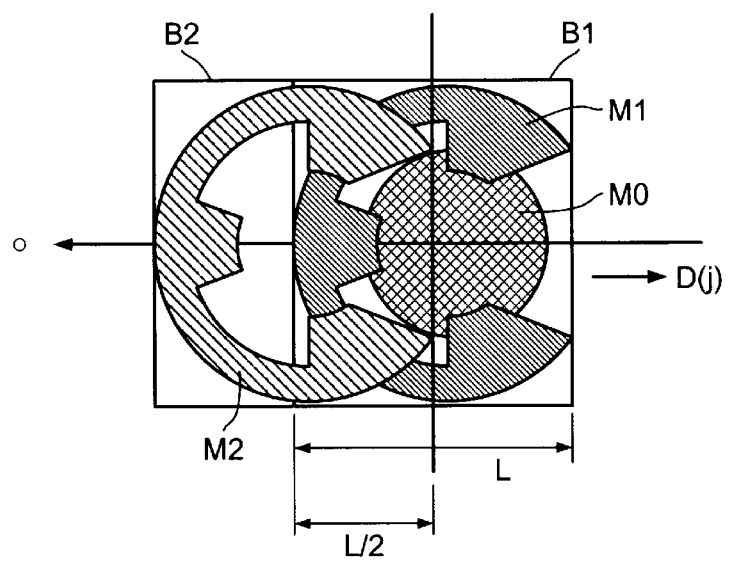
FIGS. 16A and 16B are explanatory views of a first interference judgment example.
Figure 16B:
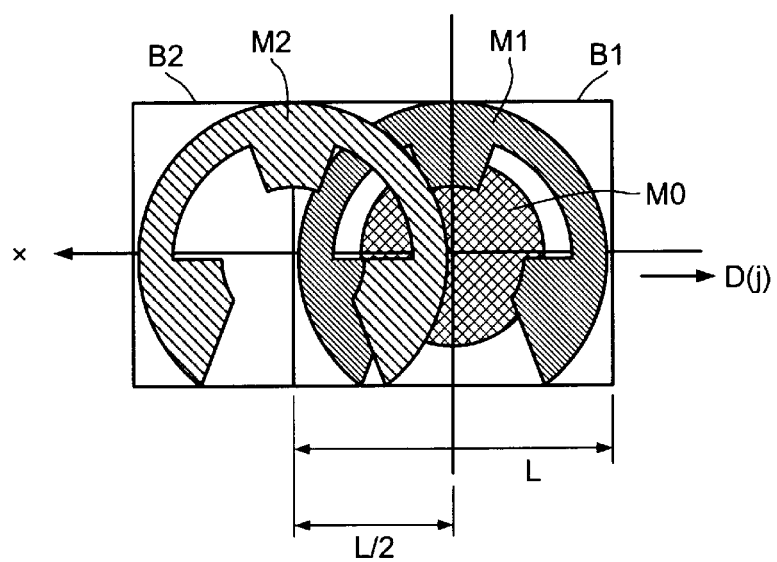

FIGS. 16A and 16B are explanatory views of a first interference judgment example. In FIGS. 16A and 16B, the E-ring 101 is taken as an example of the selected model. FIGS. 16A and 16B depict an example of the selected model moved in the direction opposite to the verification direction D(j) by ½ of a value L of the parameter having the same direction as the verification direction. In FIGS. 16A and 16B, B1 denotes a bounding box before the movement; B2 denotes a bounding box after the movement; M1 denotes a selected model before the movement; and M2 denotes a selected model after the movement. M0 denotes a model of the assembly destination of the selected model M.

In the case depicted in FIG. 16A, when the selected model M1 is moved in the direction opposite to the verification direction D(j), the selected models M1 and M2 cause no interference. Therefore, an additional score AP4 is added to the score Bp of the verification direction D(j). On the other hand, in the case depicted in FIG. 16B, when the selected model M1 is moved in the direction opposite to the verification direction D(j), the selected models M1 and M2 cause interference. Therefore, the additional score AP4 is not added to the score Bp of the verification direction D(j).

Figure 17:
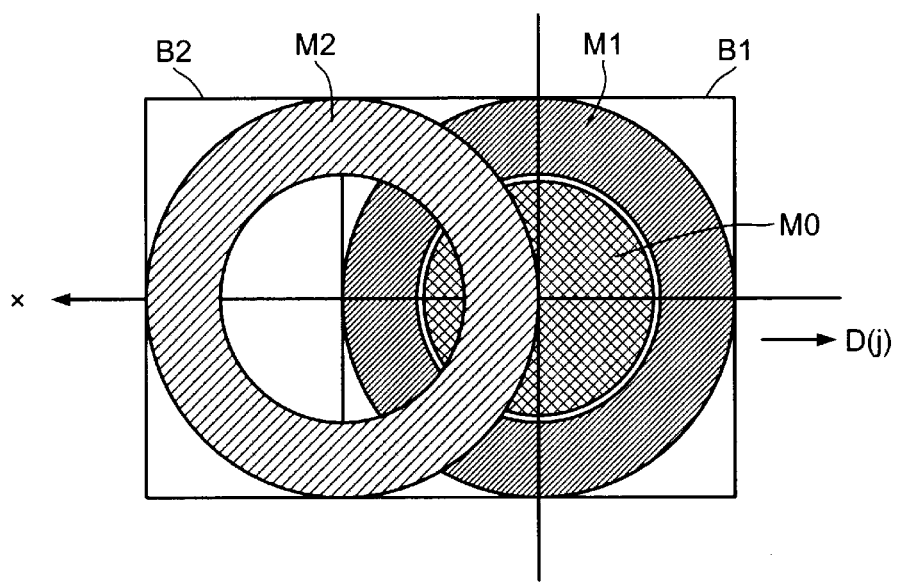
FIG. 17 is an explanatory view of a second interference judgment example.

FIG. 17 is an explanatory view of an second interference judgment example. In FIG. 17, an O-ring is taken as an example of the selected model. In FIG. 17, because of the O-ring, when the selected model M1 is moved in the direction opposite to the verification direction D(j), the selected models M1 and M2 cause interference regardless of the verification direction D(j). Therefore, the additional score AP4 is not added to the score Bp of the verification direction D(j).

Since the interference judging unit 1364 uniformly moves a model by a constant amount to make the interference judgment between models before and after the movement instead of performing an interference check each time the model is moved by a minute amount as in the conventional interference check, the interference judgment process can be simplified. The movement amount is set to a predetermined amount not exceeding the length of the verification model in the verification direction, for example, ½ or ¼ of the length in the verification direction. Therefore, the interference judging unit 1364 can detect a state in which a non-annular component such as the E-ring 101 and a clip does not interfere with an assembly counterpart. Therefore, the interference judging unit 1364 can identify in which direction the selected model is assembled or in which direction the selected model is disassembled if the selected model is a non-annular component.

If the interference judging unit 1364 determines that no interference occurs, the calculating unit 1305 adds the additional score AP4 to the score Bp.

The determining unit 1307 determines a direction opposite to the verification direction of the projection image having the highest score among the scores calculated by the calculating unit 1305 as a disassembly direction for disassembling the selected model from assembly data and stores the disassembly direction in the storage unit 1301 in correlation with the selected model. For example, the determining unit 1307 determines, as the disassembly direction, a direction opposite to the verification direction used for projecting the projection image having the highest score among the scores Bp obtained from a total of 12 directions, i.e., the six directions of the local coordinate system and the six directions of the global coordinate system. Alternatively, the determining unit 1307 determines, as the assembly direction, the verification direction used for projecting the projection image having the highest score. The determining unit 1307 stores the determined disassembly direction and assembly direction in the top-priority direction field of the component information 500 or the assembly information 600 of the selected model.

The setting unit 1308 has a viewpoint setting unit 1381 and a movement amount setting unit 1382. The viewpoint setting unit 1381 sets a viewpoint in a viewpoint direction having the gaze point same as the disassembly direction of the selected model and an orientation different from the disassembly direction, and stores the viewpoint in the storage unit 1301 in correlation with the selected model. Since a model moves in a direction parallel to the depth dimension from a viewpoint in the disassembly direction, an animation becomes difficult to understand. Therefore, the viewpoint setting unit 1381 sets a viewpoint to a coordinate value at a position acquired by tilting each of a zenith angle and an azimuth angle by a predetermined angle (e.g., 30 degrees) and stores the viewpoint in the viewpoint field of the component information 500 or the assembly information 600.

Figure 18A:
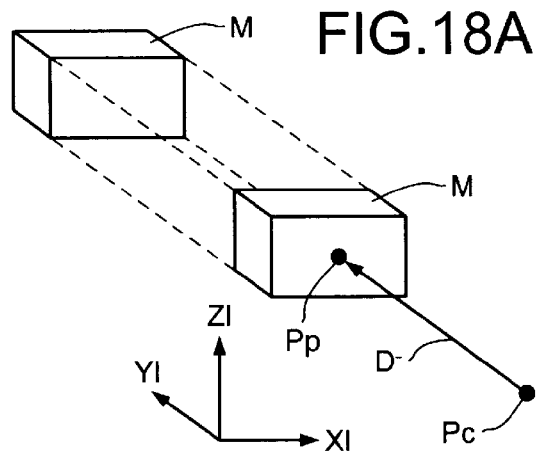
FIGS. 18A, 18B and 18C are explanatory views of a viewpoint setting example.
Figure 18B:
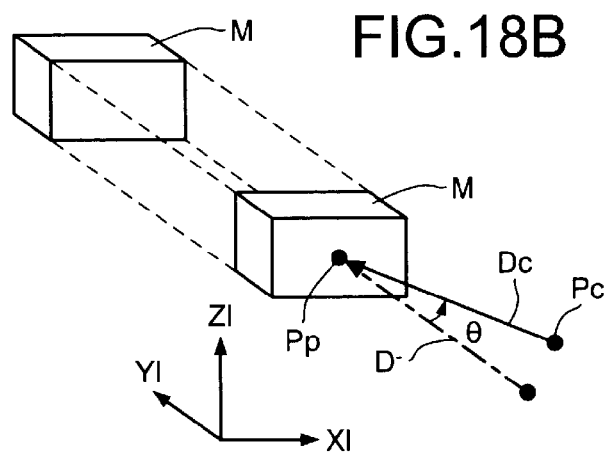
Figure 18C:
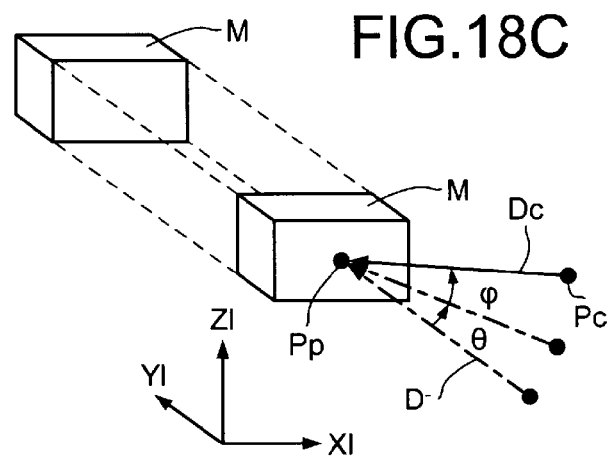

FIGS. 18A, 18B, 18C are explanatory views of a viewpoint setting example. In FIGS. 18A to 18C, M denotes a given model; Pc denotes a viewpoint; Pp denotes a gaze point; D—denotes a disassembly direction of the model M determined by the determining unit 1307; and Dc denotes a changed viewpoint direction. The viewpoint setting unit 1381 sets the viewpoint direction Dc with only the viewpoint position changed without changing the gaze point Pp. FIG. 18A depicts a state before setting the viewpoint. FIG. 18B depicts a state when the viewpoint Pc is rotated about the gaze point Pp by a horizontal angle $\theta$. FIG. 18C depicts a state when the viewpoint Pc is rotated about the gaze point Pp by a zenith angle $\phi$ from the state depicted in FIG. 18B.

In the setting by the viewpoint setting unit 1381, the rotation may be performed only by the horizontal angle $\theta$ or the rotation may be performed only by the zenith angle $\phi$. Alternatively, the rotation may be performed by a rotation angle using the viewpoint direction as a rotational axis. The viewpoint P is not limited to the rotation above but also may be translated. The viewpoint setting unit 1381 sets the viewpoint as described above, thereby improving the viewability when an animation is reproduced.

The movement amount setting unit 1382 sets the movement amount of the selected model moved in the disassembly direction based on the length of the selected model in the disassembly direction and stores the movement amount into the storage device in correlation with the selected model. For example, the movement amount setting unit 1382 calculates the parameters (height, width, and depth) of the bounding box of the selected model in the coordinate system of the disassembly direction of the selected model. The movement amount setting unit 1382 multiplies a value of the parameter having the same direction as the disassembly direction of the selected model out of the parameters by a predetermined number (e.g., three) to set the movement amount.

FIG. 19 is a diagram of an example of the setting of the movement amount. In FIG. 19, M0 denotes a model of the assembly destination and M1 denotes a selected model. In FIG. 19, the length of the selected model M1 in the bounding box in the disassembly direction is assumed to be 200. In this case, for example, the movement amount is set to 200×3=600. Since the selected model is sufficiently separated from the assembly by multiplying the value of the parameter having the same direction as the disassembly direction of the selected model by a predetermined value to set the movement amount, disassembling is easily visible.

Figure 20:
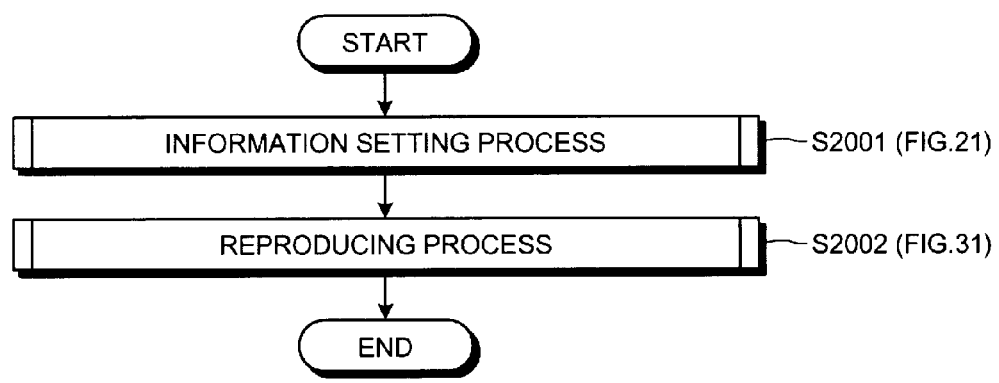
FIG. 20 is a flowchart of a detailed process procedure of an information generating process by the information generating apparatus 1300.

FIG. 20 is a flowchart of a detailed process procedure of an information generating process by the information generating apparatus 1300. The information generating apparatus 1300 executes the information setting process (step S2001) and a reproducing process (step S2002). In the information setting process (step S2001), disassembly and assembly directions, a viewpoint, and a movement amount are set for each selected model and, in the reproducing process (step S2002), disassembly animation is reproduced by using the information set in the information setting process (step S2001). Assembly animation may also be reproduced. The details of the information setting process (step S2001) will be described with reference to FIG. 21 and the details of the reproducing process (step S2002) will be described with reference to FIG. 31.

Figure 21:
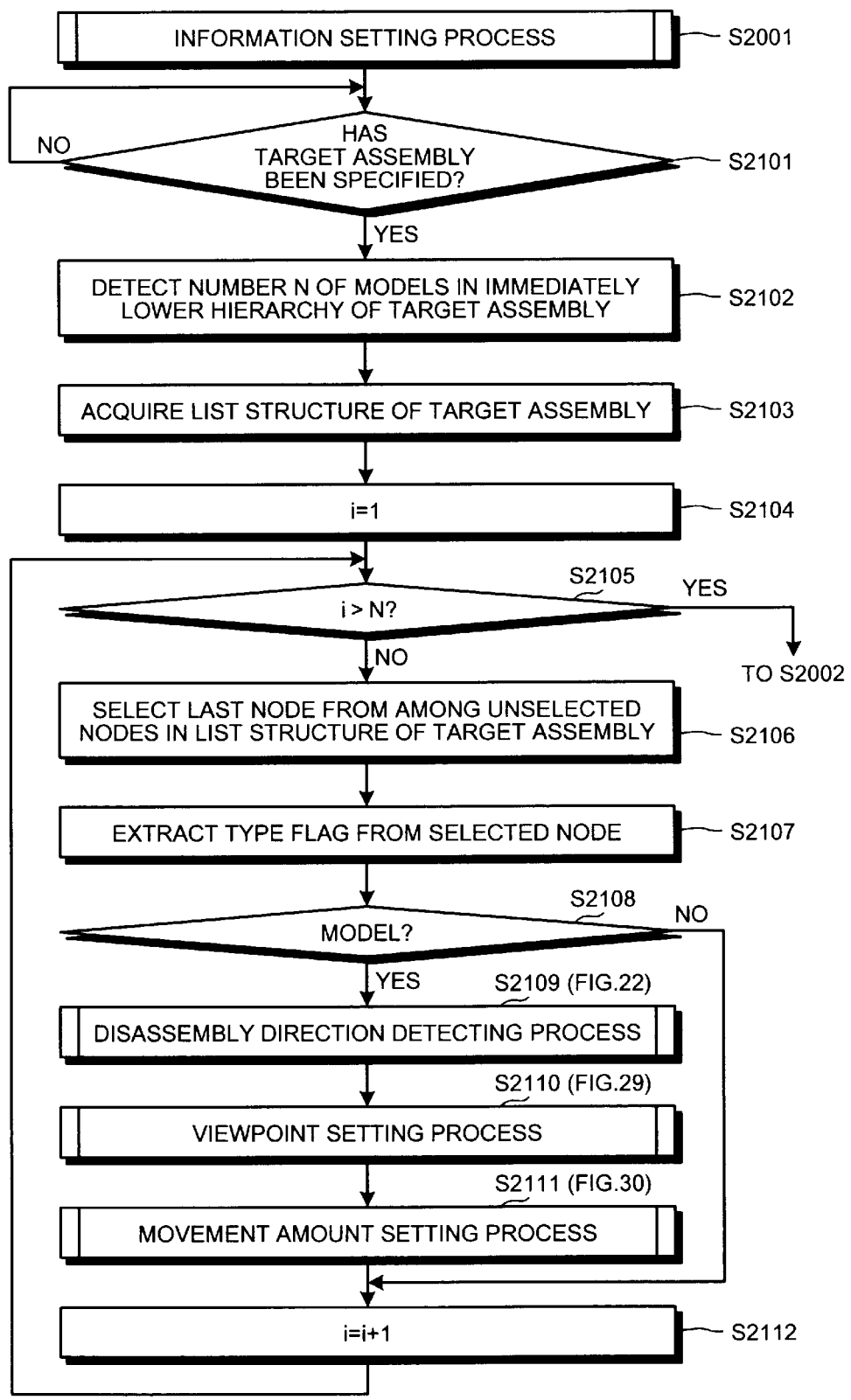
FIG. 21 is a flowchart of a detailed process procedure of the information setting process (step S2001) depicted in FIG. 20.

FIG. 21 is a flowchart of a detailed process procedure of the information setting process (step S2001) depicted in FIG. 20. First, the information generating apparatus 1300 waits until a target assembly is specified (step S2101: NO). For example, the information generating apparatus 1300 waits until a target assembly is specified from a manufacturing flow via user operation.

When a target assembly has been specified (step S2101: YES), the information generating apparatus 1300 detects the number N of models in the immediately lower hierarchy of the target assembly (step S2102). For example, the information generating apparatus 1300 extracts a value stored in the immediately lower constituent model count field of the assembly information 600 of the target assembly. This value is identical to the number of models in a separated manufacturing flow for the target assembly.

The information generating apparatus 1300 identifies the separated manufacturing flow of the target assembly from the separated manufacturing flows stored in the storage device and acquires the list structure thereof (step S2103). For example, if the target assembly is A0, the information generating apparatus 1300 acquires the list structure 1101 (FIG. 11) corresponding to the separated manufacturing flow 901 depicted in FIG. 9.

The information generating apparatus 1300 sets an index i of a counter to i=1 (step S2104) and determines whether i>N is satisfied (step S2105). In other words, it is determined whether the information generating apparatus 1300 has selected all the models in the acquired list structure.

If i>N is not satisfied (step S2105: NO), the information generating apparatus 1300 selects the last node among unselected nodes in the list structure of the target assembly (step S2106). Although nodes may be selected in an arbitrary order, the models can be selected sequentially from the last assembled model in the manufacturing flow by starting the selection from the last node.

The information generating apparatus 1300 extracts a type flag from the selected node (step S2107) to determine whether the selected node is a model (step S2108). If the type flag is "0" or "1", the selected node is a model and, in the case of "2", which denotes a process, the selected node is not a model.

If it is determined that the selected node is not a model (step S2108: NO), the procedure transitions to step S2112. In contrast, if it is determined that the selected node is a model (step S2108: YES), the information generating apparatus 1300 executes a disassembly direction detecting process (step S2109), a viewpoint setting process (step S2110), and a movement amount setting process (step S2111) and transitions to step S2112.

The disassembly direction detecting process (step S2109) is a process of detecting a disassembly direction of a selected node determined as a model, i.e., a selected model. Details will be described with reference to FIG. 22. The viewpoint setting process (step S2110) is a process of setting a viewpoint of a selected model. Details will be described with reference to FIG. 29. The movement amount setting process (step S2111) is a process of setting a movement amount of a selected model. Details will be described with reference to FIG. 30.

At step S2112, the information generating apparatus 1300 increments the index i of the counter (step S2112) and returns to step S2105. If it is determined at step S2105 that i>N is satisfied (step S2105: YES), the information generating apparatus 1300 transitions to the reproducing process (step S2002) depicted in FIG. 20. As described above, with the information setting process (step S2001), disassembly and assembly directions, a viewpoint, and a movement amount can be set for each selected model.

Figure 22:
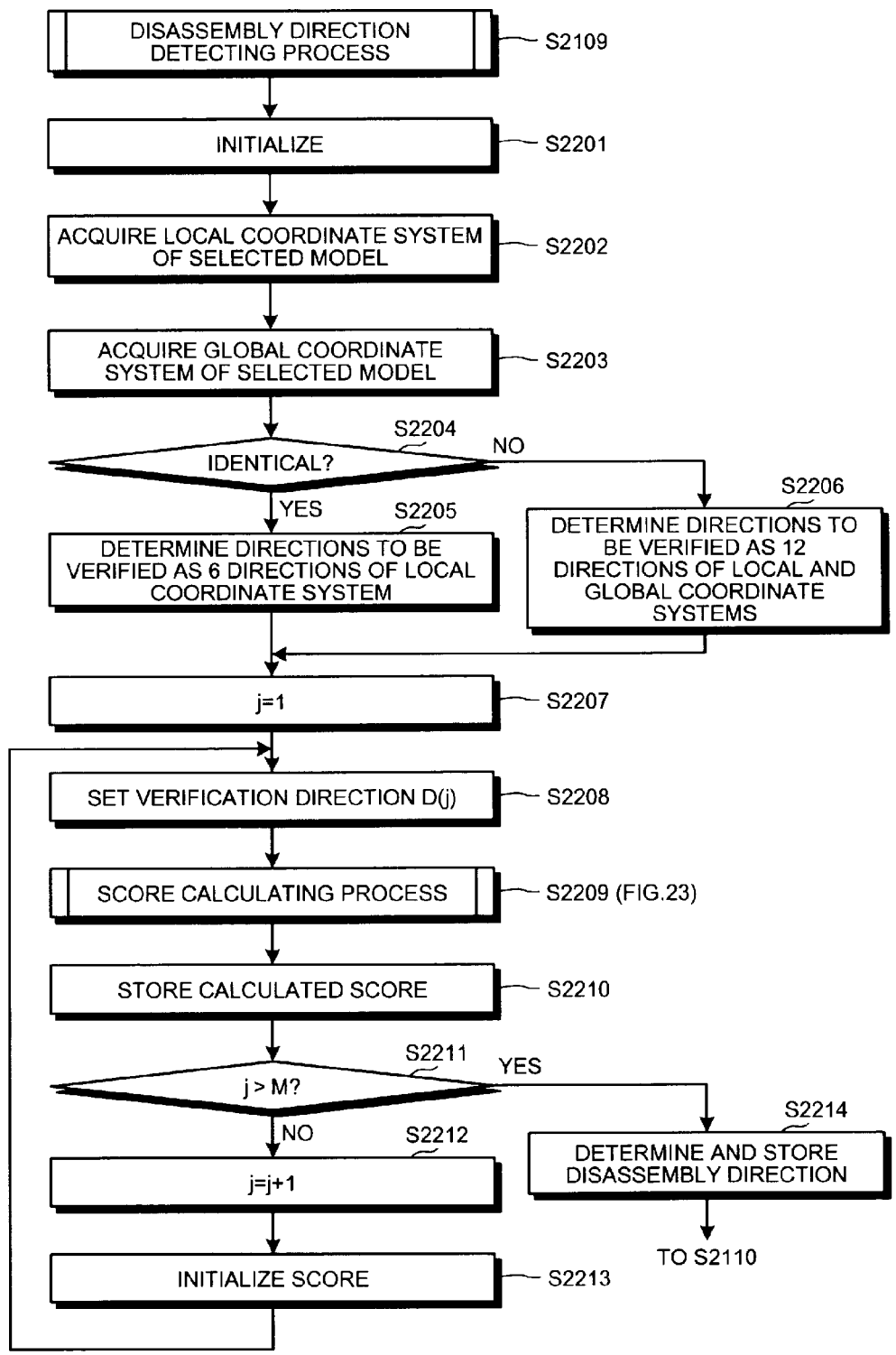
FIG. 22 is a flowchart of a detailed process procedure of the disassembly direction detecting process (step S2109) depicted in FIG. 21.

FIG. 22 is a flowchart of a detailed process procedure of the disassembly direction detecting process (step S2109) depicted in FIG. 21. In FIG. 21, the information generating apparatus 1300 initializes the score Bp and the additional scores Ap1 to AP4 (=0) (step S2201) and acquires the local coordinate system of the selected model (step S2202). The information generating apparatus 1300 acquires the global coordinate system of the selected model (step S2203). The local coordinate system and the global coordinate system are acquired with the technique depicted in FIG. 7.

The information generating apparatus 1300 determines whether the acquired local coordinate system and global coordinate system are identical to each other (step S2204). If identical (step S2204: YES), the information generating apparatus 1300 determines the directions to be verified as six directions (+Xl to −Zl), which are the positive and negative axial directions of the local coordinate system (step S2205) and transitions to step S2207. If not identical (step S2204: NO), the information generating apparatus 1300 determines the directions to be verified as 12 directions (+Xl to −Zl and +Xg to −Zg) that are the positive and negative axial directions of the local and global coordinate systems (step S2206). The information generating apparatus 1300 transitions to step S2207.

The information generating apparatus 1300 sets an index j of the verification direction to j=1 (step S2207) to set the verification direction D(j) (step S2208). The verification direction D(j) is set from among the six directions (+Xl to −Zl) if six directions are determined at step S2205 and is set from among 12 directions (+Xl to −Zl and +Xg to −Zg) if 12 directions are determined at step S2206.

The information generating apparatus 1300 executes a score calculating process (step S2209). The score calculating process (step S2209) is a process of calculating the score Bp indicative of whether the direction opposite to the verification direction D(j) is the disassembly direction of the selected model for each verification direction D(j). The details of the score calculating process (step S2209) will be described with reference to FIG. 23.

After the score calculating process (step S2209), the information generating apparatus 1300 stores the calculated score Bp (step S2210). For example, if the selected model is a component and the verification direction D(j) is "+Xl", the calculated score Bp is stored in the +Xl field of the six-axis score field in the component information 500 of the selected model. If the selected model is an assembly and the verification direction D(j) is "+Xg", the calculated score Bp is stored in the +Xg field of the six-axis score field in the assembly information 600 of the selected model.

The information generating apparatus 1300 determines whether j>M is satisfied (step S2211). M denotes the number of directions to be verified. For example, M=6 is defined if six directions are determined at step S2205 and M=12 is defined if 12 directions are determined at step S2206.

If j>M is not satisfied (step S2211: NO), an unverified direction exists and therefore, the information generating apparatus 1300 increments j (step S2212), initializes the score Bp (step S2213), and returns to step S2208. On the other hand, If j>M is satisfied (step S2211: YES), the information generating apparatus 1300 identifies the highest score among the scores of the M directions and determines the disassembly direction to be the direction opposite to the direction having the highest score (assembly direction) (step S2214). The disassembly direction and the assembly direction are stored to the top-priority direction field of the component information 500 or the assembly information 600. The information generating apparatus 1300 transitions to the viewpoint setting process (step S2110).

Figure 23:
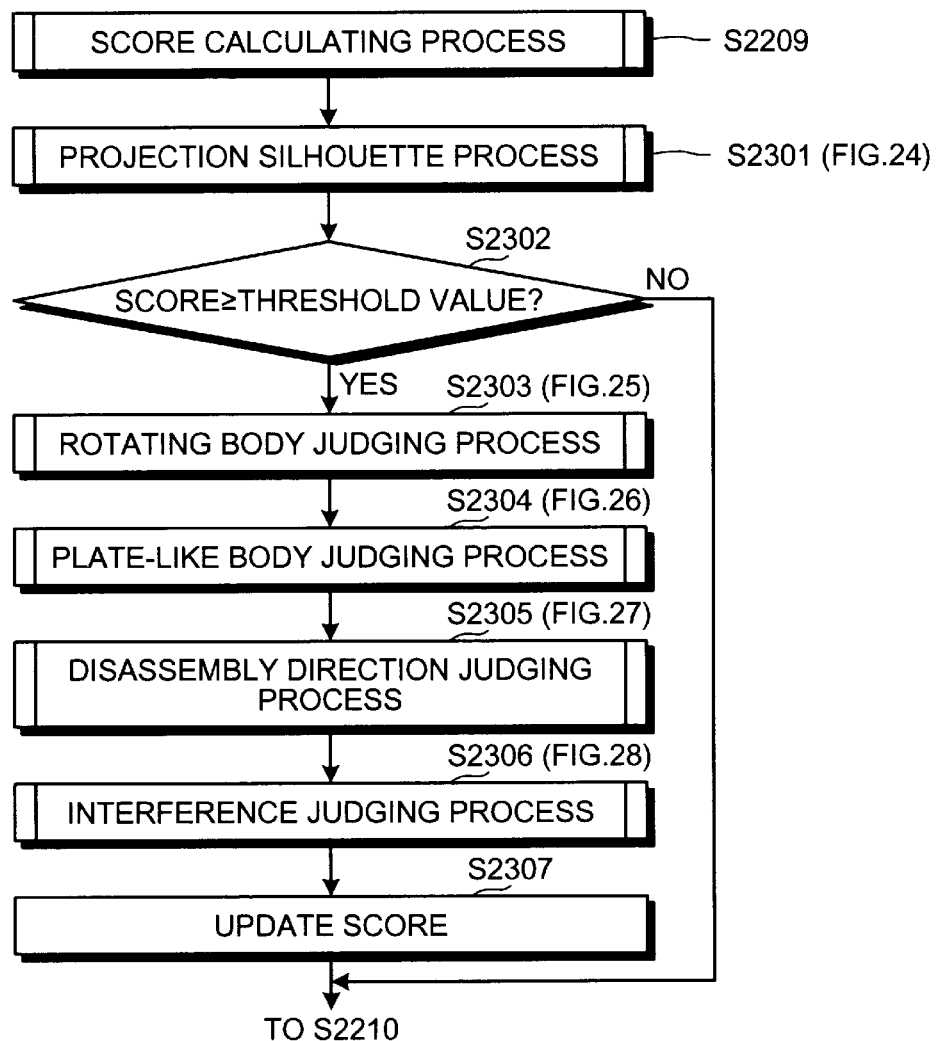
FIG. 23 is a flowchart of a detailed process procedure of a score calculating process (step S2209) depicted in FIG. 22.

FIG. 23 is a flowchart of a detailed process procedure of the score calculating process (step S2209) depicted in FIG. 22. The information generating apparatus 1300 executes a projection silhouette process (step S2301). The projection silhouette process (step S2301) is a process of calculating the score Bp as described with reference to FIG. 1 and the calculating unit 1305. The details of the projection silhouette process (step S2301) will be described with reference to FIG. 24.

After the projection silhouette process (step S2301), the information generating apparatus 1300 determines if the score Bp calculated in the projection silhouette process (step S2301) is equal to or greater than a threshold value (step S2302). In this example, the threshold value is assumed to be set to 50 since the upper limit of the score Bp is 100. If the score Bp is equal to or greater than the threshold value (step S2302: YES), the information generating apparatus 1300 executes a rotating body judging process (step S2303), a plate-like body judging process (step S2304), a disassembly direction judging process (step S2305), and an interference judging process (step S2306) to update the score Bp (step S2307). The information generating apparatus 1300 then transitions to step S2210.

In contrast, if the score Bp is not equal to or greater than the threshold value (step S2302: YES), it is determined that disassembly cannot be done in the direction opposite to the direction having the highest score. Therefore, the information generating apparatus 1300 transitions to step S2210 without executing the rotating body judging process (step S2303) to the interference judging process (step S2306).

Figure 24:
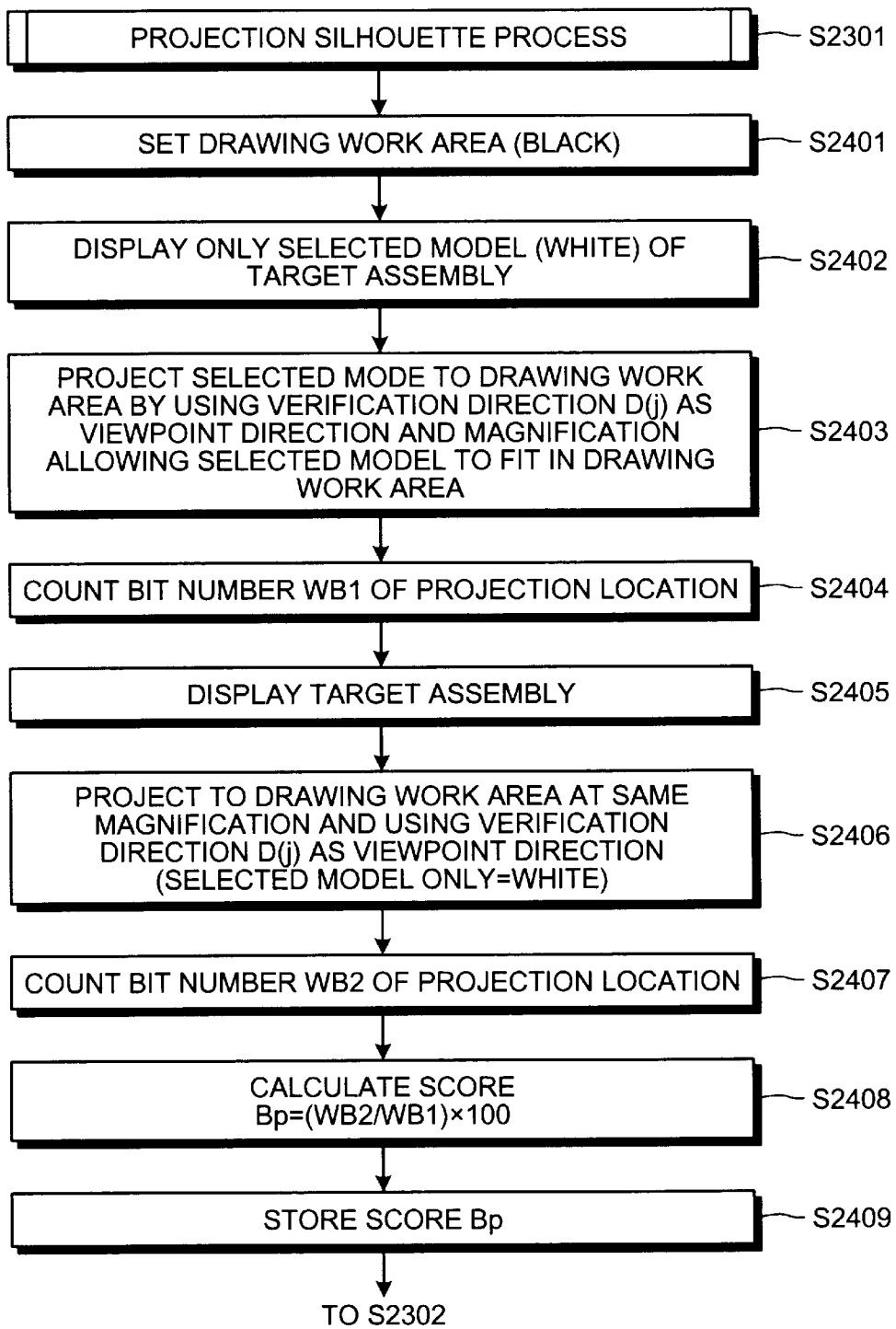
FIG. 24 is a flowchart of a detailed process procedure of a projection silhouette process (step S2301) depicted in FIG. 23.

FIG. 24 is a flowchart of a detailed process procedure of the projection silhouette process (step S2301) depicted in FIG. 23. The information generating apparatus 1300 sets the background color of a bitmap used as a drawing work area to black, for example (step S2401). The information generating apparatus 1300 displays the selected model of the target assembly in a given color different from the background color, for example, in white (step S2402). At this step, models other than the selected model are not displayed.

The information generating apparatus 1300 projects the selected mode to the drawing work area by using the verification direction D(j) as a viewpoint direction and magnification allowing the selected model to fit into the drawing work area (step S2403). The information generating apparatus 1300 counts the number WB1 of the bits of the given color (white), i.e., projection portions, of the selected model (step S2404).

The information generating apparatus 1300 displays the target assembly (step S2405) and uses a given color (white) for the selected model and the background color for other models to project the selected model to the drawing work area at the same magnification as step S2403 (step S2406). The information generating apparatus 1300 counts the number WB2 of bits projected in the given color (step S2407). The information generating apparatus 1300 then calculates the score Bp using Equation (1) described above (step S2408) and temporarily stores the score Bp to memory (step S2409). The information generating apparatus 1300 transitions to step S2302 to determine if the score Bp is equal to or greater than the threshold value.

Figure 25:
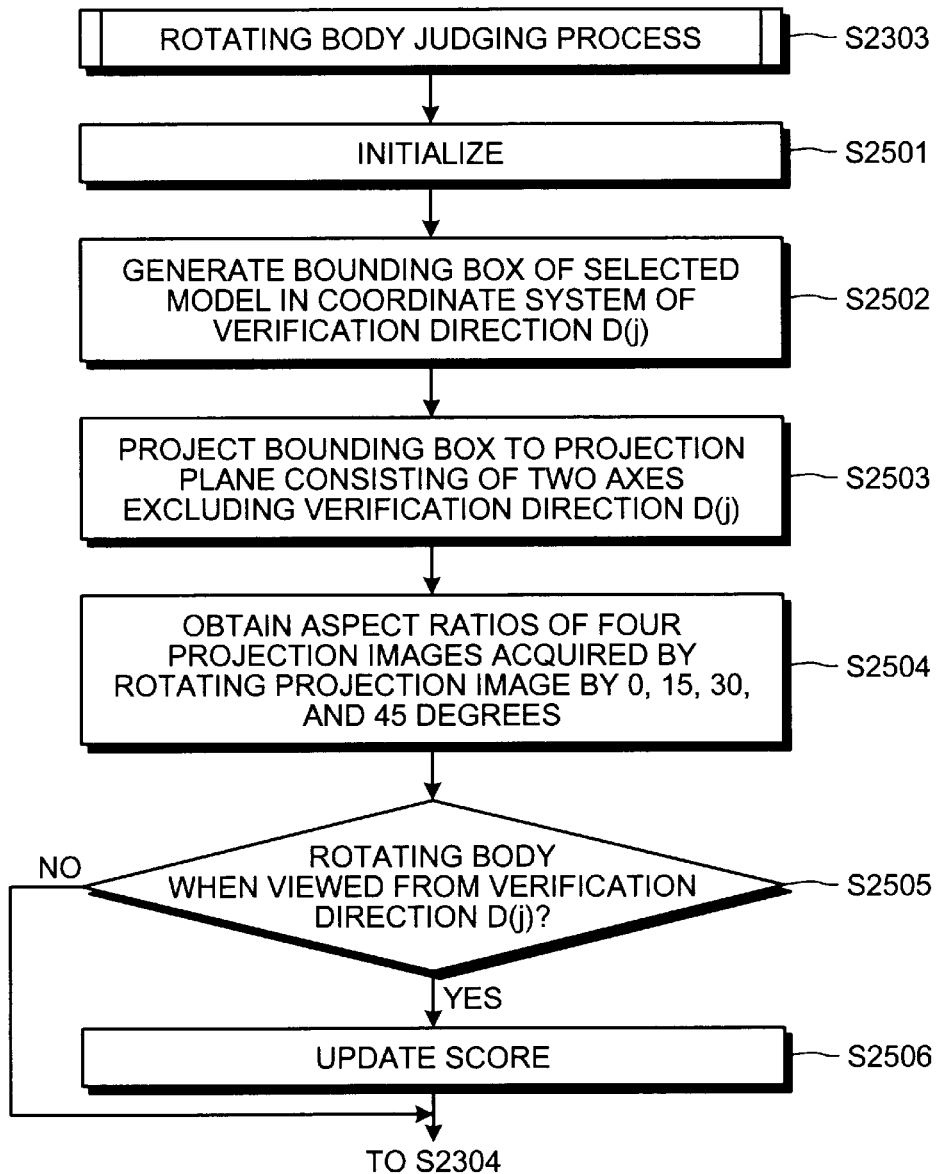
FIG. 25 is a flowchart of a detailed process procedure of a rotating body judging process (step S2303) depicted in FIG. 23.

FIG. 25 is a flowchart of a detailed process procedure of the rotating body judging process (step S2303) depicted in FIG. 23. The information generating apparatus 1300 initializes the additional score AP1 (step S2501) and generates a bounding box of the selected model in the coordinate system of the verification direction D(j) (step S2502). The information generating apparatus 1300 projects the bounding box to a projection plane including two axes exclusive of the verification direction D(j) (step S2503). The information generating apparatus 1300 obtains the aspect ratios V/H of vertical lengths V×horizontal lengths H of four projection images acquired by rotating the projection image by 0, 15, 30, and 45 degrees (step S2504).

The information generating apparatus 1300 then determines whether the selected model is a rotating body when viewed from the verification direction D(j) according to the aspect ratios of the respective rotation angles (step S2505). If the selected model is a rotating body (step S2505: YES), the information generating apparatus 1300 adds the additional score AP1 to the score Bp to update the score BP (step S2506) and transitions to the plate-like body judging process (step S2304). In contrast, if the selected model is not a rotating body (step S2505: NO), the information generating apparatus 1300 transitions to the plate-like body judging process (step S2304) without adding the additional score AP1.

Figure 26:
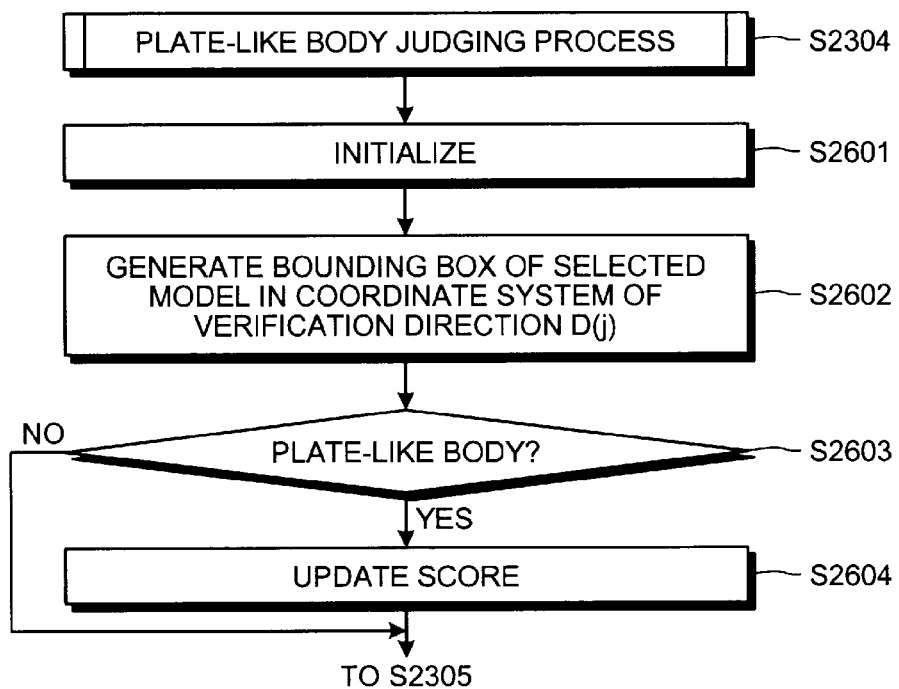
FIG. 26 is a flowchart of a detailed process procedure of a plate-like body judging process (step S2304) depicted in FIG. 23.

FIG. 26 is a flowchart of a detailed process procedure of the plate-like body judging process (step S2304) depicted in FIG. 23. The information generating apparatus 1300 initializes the additional score AP2 (step S2601) and generates a bounding box of the selected model in the coordinate system of the verification direction D(j) (step S2602). The information generating apparatus 1300 determines whether the selected model is a plate-like body as depicted in FIG. 15 (step S2603).

If the selected model is a plate-like body (step S2603: YES), the information generating apparatus 1300 adds the additional score AP2 to the score Bp to update the score BP (step S2604) and transitions to the disassembly direction judging process (step S2305). In contrast, if the selected model is not a plate-like body (step S2603: NO), the information generating apparatus 1300 transitions to the disassembly direction judging process (step S2305) without adding the additional score AP2.

Figure 27:
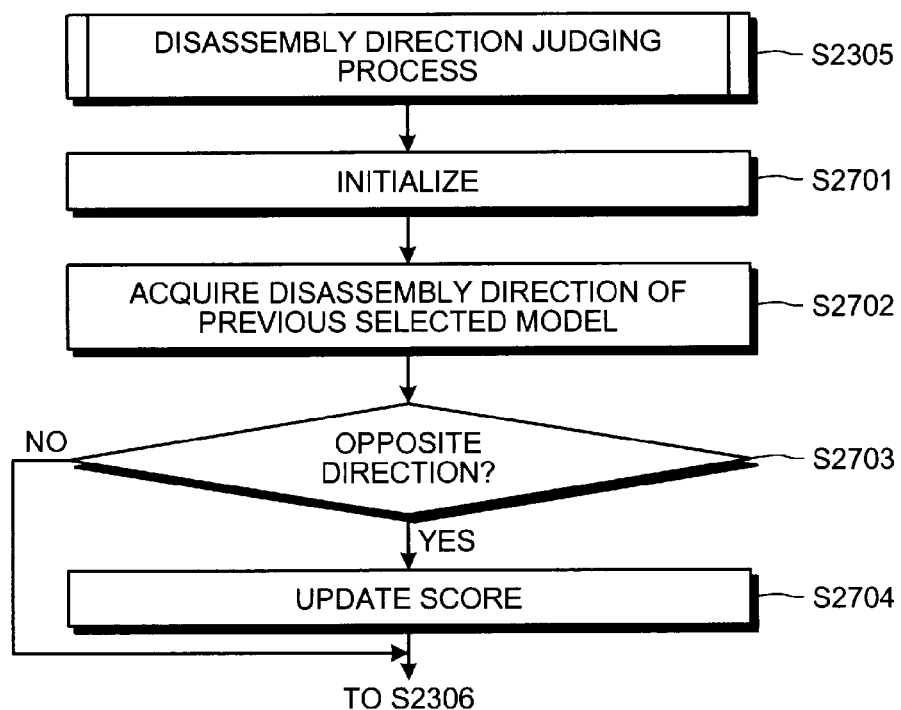
FIG. 27 is a flowchart of a detailed process procedure of a disassembly direction judging process (step S2305) depicted in FIG. 23.

FIG. 27 is a flowchart of a detailed process procedure of the disassembly direction judging process (step S2305) depicted in FIG. 23. The information generating apparatus 1300 initializes the additional score AP3 (step S2701) and acquires the disassembly direction of the previous selected model (step S2702). The information generating apparatus 1300 determines whether the disassembly direction is opposite to the verification direction D(j) (steps 2703).

If the disassembly direction is opposite (step S2703: YES), the information generating apparatus 1300 adds the additional score AP3 to the score Bp to update the score BP (step S2704) and transitions to the interference judging process (step S2306). In contrast, if the disassembly direction is not opposite (step S2703: NO), the information generating apparatus 1300 transitions to the interference judging process (step S2306) without adding the additional score AP3.

Figure 28:
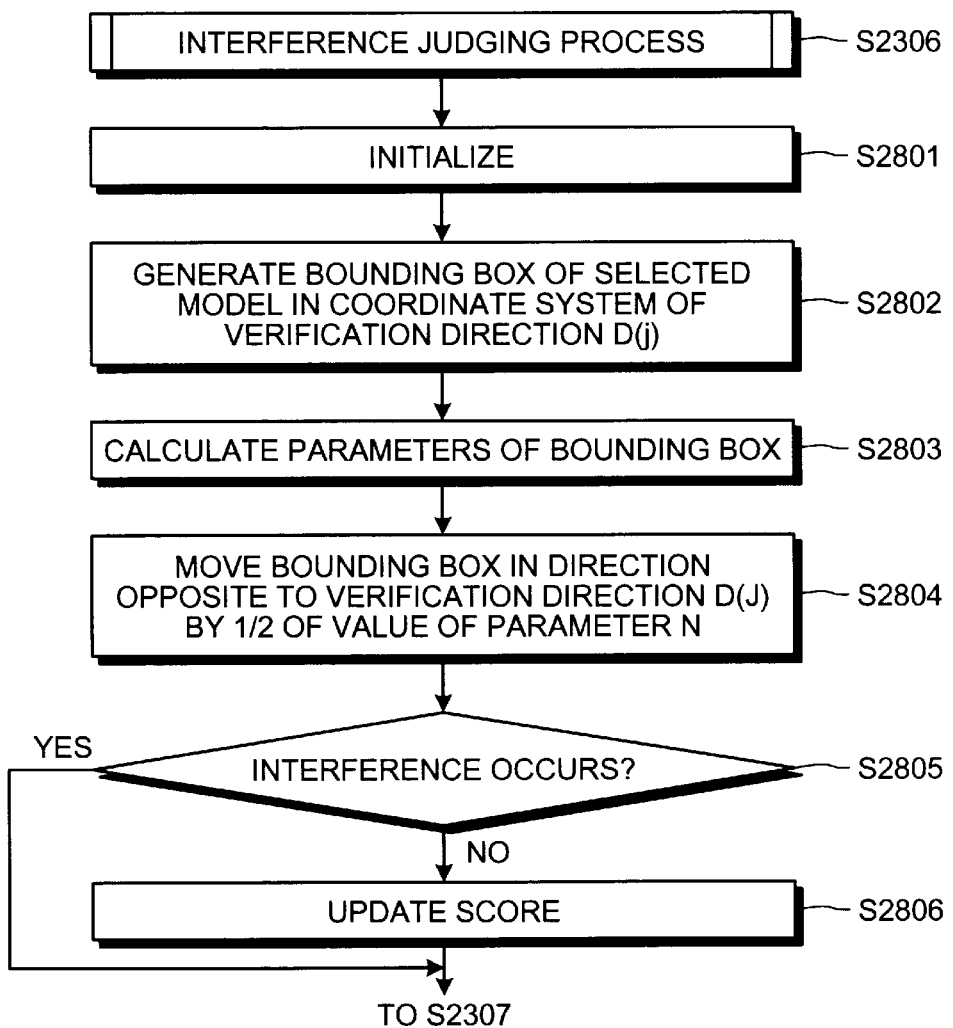
FIG. 28 is a flowchart of a detailed process procedure of an interference judging process (step S2306) depicted in FIG. 23.

FIG. 28 is a flowchart of a detailed process procedure of the interference judging process (step S2306) depicted in FIG. 23. The information generating apparatus 1300 initializes the additional score AP4 (step S2801) and generates a bounding box of the selected model in the coordinate system of the verification direction D(j) (step S2802). The information generating apparatus 1300 calculates parameters (height, width, and depth) of the three axial directions of the coordinate system of the verification direction D(j) for the bounding box (step S2803).

The information generating apparatus 1300 moves the bounding box in the direction opposite to the verification direction D(j) by ½ of the value of the parameter of the opposite direction (step S2804). The information generating apparatus 1300 compares the selected model before and after the movement to determine whether interference occurs (step S2805). If no interference occurs (step S2805: NO), the information generating apparatus 1300 adds the additional score AP4 to the score Bp to update the score BP (step S2806) and transitions to step S2307. If interference occurs (step S2805: YES), the information generating apparatus 1300 transitions to step S2307 without adding the additional score AP4.

FIG. 29 is a flowchart of a detailed process procedure of the viewpoint setting process (step S2110) depicted in FIG. 21. The information generating apparatus 1300 acquires the disassembly direction of the selected model (step S2901) and sets a viewpoint at a position acquired by tilting each of a zenith angle and an azimuth angle by a predetermined angle without moving the gaze point (center of a screen) (step S2902). The information generating apparatus 1300 stores the coordinate value of the viewpoint (step S2903). For example, the information generating apparatus 1300 stores the coordinate value of the viewpoint to the viewpoint field of the component information 500 of the selected model if the selected model is a component, and stores the coordinate value of the viewpoint to the viewpoint field of the assembly information 600 of the selected model if the selected model is an assembly. The information generating apparatus 1300 then transitions to the movement amount setting process (step S2111).

FIG. 30 is a flowchart of a detailed process procedure of the movement amount setting process (step S2111) depicted in FIG. 21. The information generating apparatus 1300 acquires the disassembly direction of the selected model (step S3001) and generates a bounding box of the selected model in the coordinate system of the verification direction D(j) (step S3002).

The information generating apparatus 1300 calculates parameters (height, width, and depth) of the three axial directions of the coordinate system of the verification direction D(j) for the bounding box (step S3003). The information generating apparatus 1300, among the parameters, multiplies the value of a parameter having a direction identical to the disassembly direction by a given amount and sets the result as the movement amount (step S3004). The information generating apparatus 1300 then transitions to step S2112.

FIG. 31 is a flowchart of a detailed process procedure of the reproducing process (step S2002) depicted in FIG. 20. The information generating apparatus 1300 sets the index i of the counter to i=1 (step S3101) and determines whether i>N is satisfied (step S3102). In other words, it is determined whether the information generating apparatus 1300 has reproduced all the models in the acquired list structure.

If i>N is not satisfied (step S3102: NO), the information generating apparatus 1300 selects the last node out of unselected nodes in the list structure of the target assembly (step S3103). The information generating apparatus 1300 extracts a type flag from the selected node (step S3104) to determine whether the selected node is a model (step S3105). If the type flag is "0" or "1", the selected node is a model and, in the case of "2", which denotes a process, the selected node is not a model.

If it is determined that the selected node is not a model (step S3105: NO), the procedure transitions to step S3107. In contrast, if it is determined that the selected node is a model (step S3105: YES), the information generating apparatus 1300 reproduces disassembly animation of the selected model (step S3106). For example, if the selected model is a component, the information generating apparatus 1300 reads the disassembly direction, the viewpoint, and the movement amount of the component information 500 to reproduce the disassembly animation. If the selected model is an assembly, the information generating apparatus 1300 reads the disassembly direction, the viewpoint, and the movement amount of the assembly information 600 to reproduce the disassembly animation.

The information generating apparatus 1300 subsequently increments i at step S3107 (step S3107) and returns to step S3102. If i>N is satisfied at step S3102 (step S3102: YES), a series of processes is terminated.

As described above, the embodiment enables the detection of assembly direction and disassembly direction, which are undetectable with the conventional interference check, for the models of the E-rings 101 and the like among the immense number of components. Therefore, higher accuracy can be achieved in the detection of the direction used in animation reproduction. Since a conventional interference check is not performed, a computation load can be reduced. Since the assembly direction and the disassembly direction are detected by a simple comparison of projection images, the detection speed can be increased. Since the direction detection can be performed for any model, the versatility can be improved without dependency on the type of the target product.

The information generating apparatus according to the embodiment automatically generates a 3D animation from a manufacturing flow by utilizing the characteristics of the manufacturing flow arranged in the assembly order examined by a creator of the flow, based on past assembly data. As a result, the order of components having motions automatically defined can be identified from the manufacturing flow. As compared to a technique used in the conventional interference check randomly verifying the order of disassembled components, the computation time consumed to obtain a result can be reduced. A user can watch animation automatically generated according to assumed assembly order so as to visibly determine whether the assembly order itself is identical to the assumed order.

The information generating apparatus according to the embodiment employs logic that does not use the interference check and therefore, can automatically generate "disassembly animation using 3D models", which is impossible when interference check logic is used. A shorter process time and higher accuracy are achieved regardless of the model shape.

The information generating apparatus according to the embodiment can shorten the time consumed for creating animation as the number of models increases. The information generating apparatus according to the embodiment does not perform the conventional interference check causing a high computation load and therefore, can detect the disassembly direction and the assembly direction with a low-performance computer that cannot perform the conventional interference check.

If multiple candidates exists for the assembly order, the information generating apparatus according to the embodiment can generate animation on-site, for each of the candidates. Therefore, the user can compare the generated animation to check "which assembly order is preferable in consideration of the motions in each animation".

The information generating apparatus according to the embodiment can immediately generate an assembly 3D animation according to an assembly order defined as a result of examination and, therefore, a user can create a 3D animation to visibly check an error in the assembly order itself. Therefore, an error in the assembly order can immediately be corrected.

When identifying the disassembly direction and the assembly direction, since the information generating apparatus according to the embodiment sets multiple modes and conditions to calculate a score, false detection can be prevented in determination in a given mode and verification can be performed from various angles so as to comprehensively make the determination as a system. Therefore, the disassembly direction can be detected with higher accuracy.

With the information generating apparatus according to the embodiment, the user can arbitrarily set the weights of the additional scores AP1 to AP4 for customization according to product characteristics. For example, the values of the additional scores AP1 to AP4 can be increased or decreased according to product characteristics. Alternatively, at least one judging process can be removed as needed so as to detect the disassembly direction according to product characteristics.

In some cases, not only while an animation is running but also while an animation is stopped to perform a close check and the like, the assembly direction is visibly checked in terms of from where and in which direction a relevant component is assembled. In such a case, the disassembly animation can be made more understandable by displaying an arrow indicative of the disassembly direction when the selected model is disassembled from a model of the assembly counterpart.

According to one aspect of the present invention, higher accuracy can be achieved in the detection of a disassembly direction of a model.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute an information generating process comprising:
   selecting an arbitrary model from a storage device storing assembly data of an assembly assembled from a plurality of models;
   projecting in a plurality of directions, the selected arbitrary model to a first area in a color different from a background color of the first area to generate first projection images, and projecting in the directions and to a second area of the same size as the first area, the arbitrary model in a color different from the background color and another model other than the arbitrary model in the same color as the background color to generate second projection images;

calculating a score indicative of a matching degree between the generated first and second projection images for each of the verification directions based on comparing among the generated first and second projection images, projection images having identical verification directions selected from among the directions; and determining from the assembly data and as a disassembly direction for disassembling the arbitrary model, a direction opposite to the verification direction of the projection image having the highest score among the calculated scores, to associate and store the disassembly direction and the arbitrary model to the storage device.

2. The non-transitory computer-readable recording medium according to claim 1, the information generating process further comprising determining whether the arbitrary model is a rotating body, based on a shape of a rectangle circumscribing a projection image of the arbitrary model projected in the verification direction and a shape of a rectangle circumscribing the rotated projection image when the projection image is rotated by a predetermined angle, wherein the calculating includes updating a score for the verification direction when the arbitrary model has been determined to be a rotating body.

3. The non-transitory computer-readable recording medium according to claim 1, the information generating process further comprising determining whether the arbitrary model is a plate-like body assembled in the verification direction, based on a length of the arbitrary model in the verification direction, a length in a direction other than the verification direction and the opposite direction thereof among the directions, wherein the calculating includes updating a score for the verification direction when the arbitrary model has been determined to be a plate-like body.

4. The non-transitory computer-readable recording medium according to claim 1, the information generating process further comprising determining whether a verification direction selected, from among the directions, for the arbitrary model specified in order of disassembly based on the assembly data is identical to a direction opposite to a disassembly direction determined for a previously selected model, wherein the calculating includes updating a score for the verification direction when the directions have been determined to be identical.

5. The non-transitory computer-readable recording medium according to claim 1, the information generating process further comprising moving the arbitrary model in the direction opposite to the verification direction by a predetermined amount not exceeding a length of the arbitrary model in the verification direction to determine whether interference occurs before and after movement, wherein the calculating includes updating a score for the verification direction when interference has been determined to not occur.

6. The non-transitory computer-readable recording medium according to claim 1, the information generating process further comprising setting a viewpoint in a viewpoint direction having the same gaze point as the disassembly direction of the arbitrary model and a different orientation, associating and storing the viewpoint and the arbitrary model to the storage unit.

7. The non-transitory computer-readable recording medium according to claim 6, the information generating process further comprising reproducing animation that specifies the models in order of disassembly to move the specified model in a disassembly direction associated with the specified model and display the specified model in a direction from a viewpoint associated with the specified model toward the gaze point.

8. The non-transitory computer-readable recording medium according to claim 6, the information generating process further comprising reproducing animation that specifies the models in order of disassembly to move the specified model by a set movement amount in a disassembly direction associated with the specified model.

9. The non-transitory computer-recording medium according to claim 1, the information generating process further comprising setting a movement amount of the arbitrary model moved in the disassembly direction, based on a length of the arbitrary model in the disassembly direction, associating and storing the movement amount and the arbitrary model to the storage device.

10. The non-transitory computer-readable recording medium according to claim 1, the information generating process further comprising reproducing animation that specifies the models in order of disassembly to move the specified model in a disassembly direction associated with the specified model.

11. The non-transitory computer-readable recording medium according to claim 1, wherein the score indicative of the matching degree between the projection images is calculated based on the color in which the selected arbitrary model is projected in the first projection images and the second projection images.

12. The non-transitory computer-readable recording medium according to claim 1, wherein the assembly data are three-dimensional, computer aided design (CAD) data.

13. An information generating method executed by a computer, the information generating method comprising:

selecting an arbitrary model from a storage device storing assembly data of an assembly assembled from a plurality of models;

projecting in a plurality of directions, the selected arbitrary model to a first area in a color different from a background color of the first area to generate first projection images, and projecting in the directions and to a second area of the same size as the first area, the arbitrary model in a color different from the background color and another model other than the arbitrary model in the same color as the background color to generate second projection images;

calculating a score indicative of a matching degree between the generated first and second projection images for each of the verification directions based on comparing among the generated first and second projection images, projection images having identical verification directions selected from among the directions; and determining from the assembly data and as a disassembly direction for disassembling the arbitrary model, a direction opposite to the verification direction of the projection image having the highest score among the calculated scores, to associate and store the disassembly direction and the arbitrary model to the storage device.

14. An information generating apparatus comprising a processor configured to:
- select an arbitrary model from a storage device storing assembly data of an assembly assembled from a plurality of models,
- project in a plurality of directions, the selected arbitrary model to a first area in a color different from a background color of the first area to generate first projection images, and project in the directions and to a second area of the same size as the first area, the arbitrary model in a color different from the background color and another model other than the arbitrary model in the same color as the background color to generate second projection images,
- calculate a score indicative of a matching degree between the generated first and second projection images for each of the verification directions based on comparing among the generated first and second projection images, projection images having identical verification directions selected from among the directions, and
- determine from the assembly data and as a disassembly direction for disassembling the arbitrary model, a direction opposite to the verification direction of the projection image having the highest score among the calculated scores, to associate and store the disassembly direction and the arbitrary model to the storage device.

15. A non-transitory computer-readable recording medium storing a program for causing a computer to execute an information generating process comprising:
- generating, when a model is selected from among a plurality of models included in an assembly, first projection images of the assembly and second projection images of the model for a plurality of directions, respectively;
- calculating, for each direction, a score indicating a matching degree between a first portion of one of the first projection images and a second portion of one of the second projection images, wherein the first projection image and the second projection image are generated for the same direction, the first portion includes the selected model included in the assembly, and the second portion includes the selected model; and
- determining a direction that is opposite to a direction having the highest score as a disassembly direction for disassembling the model from the assembly.

16. A non-transitory computer-readable recording medium storing a program for causing a computer to execute an information generating process comprising:
- detecting that a model is selected from among a plurality of models included in an assembly model generated by three-dimensional computer aided design (3D CAD);
- generating for a plurality of directions, first projection images including only the selected model;
- generating for the plurality of directions, second projection images including the assembly model with the selected model being assembled thereto;
- calculating for each of the plurality of directions, a score indicating a matching degree between an area of the selected model in the first projection image and an area of the selected model in the second projection image; and
- determining as a disassembly direction for disassembling the selected model, a direction that is opposite to a direction corresponding to a relatively high score among the scores calculated for the directions.

* * * * *